US008311880B1

(12) United States Patent
Zabriskie et al.

(10) Patent No.: US 8,311,880 B1
(45) Date of Patent: Nov. 13, 2012

(54) SUPPLIER PERFORMANCE AND ACCOUNTABILITY SYSTEM

(75) Inventors: Elaine Bauer Zabriskie, Nutley, NJ (US); Ada C. Lawniczak, Flower Mound, TX (US); Ta-sheng Wei, Wayland, MA (US); Gail Z. Cardona, Freeport, NY (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 2156 days.

(21) Appl. No.: 10/284,119

(22) Filed: Oct. 30, 2002

(51) Int. Cl.
*G06Q 10/00* (2012.01)
(52) U.S. Cl. ............... 705/7.39; 705/7.38; 705/7.41
(58) Field of Classification Search ............. 705/7.38, 705/7.39, 7.41
See application file for complete search history.

(56) References Cited

U.S. PATENT DOCUMENTS

| 7,356,484 | B2 * | 4/2008 | Benjamin et al. ............ 705/7.29 |
| 2002/0178049 | A1 * | 11/2002 | Bye ................. 705/11 |
| 2003/0149613 | A1 * | 8/2003 | Cohen et al. ............ 705/11 |
| 2004/0073436 | A1 * | 4/2004 | Vaishnavi .......... 705/1 |
| 2004/0138944 | A1 * | 7/2004 | Whitacre et al. ........... 705/11 |
| 2004/0205287 | A1 * | 10/2004 | Joder et al. ............ 711/1 |

FOREIGN PATENT DOCUMENTS

WO  WO 0131485 A2 * 5/2001

OTHER PUBLICATIONS

Drongelen and Bilderbeek, R&D performance measurement: more than choosing a set of metrics, R&D Management 29, 1, 1999.*

Lambert and Pohlen, Supply Chain Metrics, International Journal of Logistics Management, vol. 12, No. 1, Dec. 18, 2001.*
Hunter, Product Review: Share and share alike with spreadsheet software, Network World, Jan. 26, 1987, p. 39 (online reprint p. 1-3).*
Auto-Tester-BMC Software Agreement; New Efforts Combine Client/Server Load Testing, Performance Monitoring, Sep. 14, 1998, Business Wire, p. 1-3.*
Cook and Johnston, Evaluating Suppliers of Complex Systems: A Multiple Criteria Approach, The Journal of the Operational Research Society, vol. 43, No. 11 (Nov. 1992), p. 1055-61.*
Lee et al., Supplier Selection and Management System Considering Relationships in Supply Chain Management, IEEE Transactions on Engineering Management vol. 48, No. 3, Aug. 2001.*
Beamon, Supply chain design and analysis: Models and methods, Int. J. Production Economics 55 (1998) p. 281-94.*

* cited by examiner

*Primary Examiner* — Justin M Pats

(57) ABSTRACT

A method and apparatus for measuring, managing and improving the quality and performance of supplied products and services across a large and potentially very diverse organization or enterprise. The invention provides a more accurate and comprehensive view of a supplier's overall quality and performance record than conventional systems and methods because it features real-time, interactive access to both quantitative and qualitative performance data throughout the entire life of the supplied product or service. The invention provides this real-time interactive access to the quality and performance data at multiple levels of detail according to user preference. In addition, the invention utilizes supplemental supplier performance indicators, such as customer satisfaction survey results and contract and diversity compliance statistics, to bring key supplier quality and performance issues into sharper focus, and provides corrective action plans to improve supplier quality, performance and accountability throughout and across an entire organization or enterprise.

103 Claims, 12 Drawing Sheets

Supplier ABC
Product: Widget Assemblies

Source: SIT database and NEBS reports
Contact: Technology
    Jim Wiseman (james.d.wiseman@verizon.com)
SQL: Elaine Bauer Zabriskie (elaine.bauer.zabriskie@verizon.com)

| Report Card | APR | MAY | JUN | APR | MAY | JUN |
|---|---|---|---|---|---|---|
| | | Preliminary (5/30/2002) | Preliminary (6/19/2002) | N/D | A | A |

| | Measurements | Grade | | | Rating | | |
|---|---|---|---|---|---|---|---|
| | 1 Lab entry - delivery | 510 | 530 | | N/D | A | B |
| | Patch addressed fixes indicated by vendor. | | | | | | |
| | 2 Lab entry - test results | 510 | 530 | | N/D | A | B |
| | Lab entry conditionally approved, with identified problems fixed in a timely manner. | | | | | | |
| | 3 Lab entry - responsiveness | 510 | 530 | | N/D | A | A |
| | Lab entry tests were performed by lab personnel. | | | | | | |
| | 4 Testing cycles - delivery | | | | N/D | A | B |
| | Material and equipment provided in a timely fashion. Additional equipment was brought in to facilitate testing cycle. Product delivered on the date specified. | | | | | | |
| | 5 Testing cycles - test results | | | | N/D | A | B |
| | No major issues on the release under test. Some enhancements to certain features will be seen in future releases. | | | | | | |
| 520 | Product can be deployed to field; critical problems and troubles addressed in time frame promised. | | | | | | |
| | 6 Testing cycles - responsiveness | | | | N/D | A | A |
| | Supplier provided on site support for the duration of the testing cycle. This facilitated testing and improved response times on any issues that arose. Good vendor support furnished on any performance issues that were raised. | | | | | | |
| | 7 NEBS Results | | | | N/D | N/D | N/D |
| | 8 Documentation | | | | N/D | A | A |
| 520 | No problem with documentation; troubles from an earlier code release were addressed in documentation. | | | | | | |

General Comments:

Very easy to work with Supplier, they made sure every base was covered during the testing cycle. Having on site support was extremely helpful in getting large amounts of test cases done in a timely manner

FIG. 5

Supplier ABC

Source: TEO Vendor Report Card (VZ East area only)
Contact Network Operations - COEI/Engr & Planning - Infra Prov
    Joe Kumor (joseph.b.kumor@verizon.com)
    Kathleen Kinneen (kathleen.p.kinneen@verizon.com)
    James Larson (jim.larson@verizon.com)

| Report Card | APR | MAY | JUN | APR | MAY | 2Q2002 |
|---|---|---|---|---|---|---|
| | | | | 97.71% | 95.09% | 94.87% |
| | Preliminary (7/19/2002) | Preliminary (7/19/2002) | Preliminary (7/29/2002) | | | |

| Measurements | Grade | | Rating | |
|---|---|---|---|---|
| 1  % Jobs w/out Service Outages | | 100.00 | 99.74 | 99.79 |
| 2  Audits - Verizon | | N/D | N/D | 81.48 |
| 3  Audits - Vendor | | N/D | N/D | 94.78 |
| 4  Specs & Central Office Records @ GMOP | | 98.73 | 99.32 | 99.37 |
| 5  Specs & CO Records @GMOP Not Requiring Changes | | 94.09 | 96.95 | 95.83 |
| 6  End of Job Survey Received | | 96.99 | 96.59 | 97.80 |
| 7  End of Job Survey Results | | 96.66 | 97.07 | 97.51 |
| 8  % Orders Completed on Time | 610 | 98.06 | 98.39 | 99.12 |

General Comments:

April Data 0 Outages out of 287 total jobs
0 Conforming audits out of a total of 0 audits
0 Conforming audits out of a total of 0 audits
234 Out of 237 total jobs
223 Correct out of a total 237
290 Received out of 299
289 Jobs conform out of a total of 299
253 Completed on time out of 258
May Data 1 Outages out of 391 total jobs
0 Conforming audits out of a total of 0 audits
0 Conforming audits out of a total of 0 audits
293 Out of 295 total jobs
286 Correct out of a total of 295
397 Received out of 411
398 Jobs conform out of a total of 410
367 Completed on time out of 373
2Q2002 Cumulative Data 2 Outages out of 975 total jobs
22 Conforming audits out of a total of 27 adults
545 Conforming audits out of a total of 575 audits
786 Out of 791 total jobs
758 Correct out of a total of 791
1024 Received out of 1047
1019 Jobs conform out of a total of 1045
898 Completed on time out of 906

FIG. 6

| Supplier Accountability e-Report Card<br>Supplier ABC<br>Product: Widget Assemblies 2Q2002 |
| --- |
| Supplier Post Deployment Measurements |

Availability/Reliability/Maintainability/Feature Availability/Feature Patch Quality/Software Quality
Source: Supplier monthly report
Contact: Supplier and Corporate Sourcing
  SQL: Jessica Bennett (jessica.r.bennett@verizon.com)

| Report Card | | APR<br>A<br>Preliminary<br>(7/30/2002) | MAY<br>B<br>Preliminary<br>(7/30/2002) | JUN<br>A<br>Preliminary<br>(7/30/2002) | APR<br>A | MAY<br>B | JUN<br>A |
| --- | --- | --- | --- | --- | --- | --- | --- |
| Measurements | | Grade | | | Value | | |
| 1 | Availability - Supplier Attributable (a) Equipment Outage Minutes, (b) Total Minutes of Availability, % Availability = (1-a/b)*100 | A | A | A  710 | 100.000% | 100.000% | 100.000% |
| 2 | Maintainability - Responsiveness of Technical Support. Number of Problem Reports (NPR) - % of critical and major problems closed on time. % time meets requirements. % reports closed / due to be closed. | A | D | A  710 | 100.000% | 85.714% | 100.000% |
| 3 | Feature Availability; # Critical and/or High Priority Features where Supplier not In Sync with Verizon Needs - As per Service and Architecture Features Schedule of Deliverables | A | A | A  710 | 0 | 0 | 0 |
| 4 | Reliability - Initial Return Rates (IRR): (a) Circuit Pack Returns, (b) IRR Population, (c) Actual Initial Return Rate, (d) Predicted Return Rate. (a/b)*100-c, percent of Circuit Pack Types having (c) less than (d) | | A | A | N/D | 100.00% | 100.000% |
| 5 | Reliability - One Year Return Rates (YRR): (a) Circuit Pack Returns, (b) YRR Population, (c) Actual Yearly Return Rate, (d) Predicted Return Rate. (a/b)*100=c, percent of Circuit Pack Types having (c) less than (d) | | F | F | N/D | 0.000% | 0.000% |
| 6 | Feature Patch Quality (FPQ 0): The most recent dominant release reported. (a) # defective feature patches per month, (b) Total # feature patches available for general release for most recent dominant release reported. c = (1-a/b)*100 | | A | A | N/D | 100.000% | 100.000% |
| 7 | Reliability - # of FCC events, Supplier attributable: 1 monthly failure or more = F; 30,000 or greater lines OOS (Out of Service) for 30 minutes or greater. | A | A | A | 0 | 0 | 0 |
| 8 | Software Update Quality (SWU 0) - The most recent dominant release reported. This measurement is used to evaluate the level of defective software updates with the goal of minimizing associated risks. | | A | A | N/D | 100.000% | 100.000% |

Average Grade : A

General Comments:

April Results
1. 2 Supplier Attributable Outages = 1875.14 Downtime Min / 691.2M Total Sys Min Avail.
(Total Sys Avail based on approx 10K DDM2000s and 6K FT2000s scheduled to run 24hours/day, 7days/week (43,200 minutes/month). *Conservative figure
2. No critical problems due to be closed this month.

FIG. 7

SUPPLIER PERFORMANCE AND ACCOUNTABILITY SYSTEM

BACKGROUND OF THE INVENTION

1. Field of Art

The present invention relates generally to the field of quality and performance assurance, and more particularly to the subject of measuring, managing and improving the quality and performance of products and services supplied by suppliers both inside and outside of an organization or enterprise. Still more particularly, the present invention relates to automated, computer network-based systems and methods for measuring, managing and improving the quality and performance of supplied products and services across large and potentially very diverse organizations and enterprises.

2. Related Art

Measuring, managing and improving the quality and performance of supplied products and services usually comprises one of the most significant problems large and diverse organizations, such as national and international manufacturing firms, national defense contractors, telecommunications providers, and state university systems, must face and solve in order to achieve their business, growth, profit, savings and/or budget objectives. In some contexts, the organization's ability to measure, control and improve the quality and performance of supplied products and services across the entire organization may be a crucial factor to the organization's success or failure in a competitive or economically-distressed industry. Consequently, companies, businesses and organizations are constantly searching for ways to measure, manage and improve the quality and performance of products and services supplied by outside vendors.

Various conventional quality assurance and quality management systems and procedures have been introduced in an attempt to address and reduce quality and performance problems. Due to a variety of shortcomings, however, conventional quality assurance and quality management systems and procedures have not resulted in much success.

To begin with, conventional supplier performance and quality management systems typically rely primarily—if not entirely—on the results of "satisfaction surveys" conducted by the vendor or the organization after the product or service which is the subject of the survey has been deployed. In other words, the satisfaction surveys are typically conducted only during the "post-deployment" stage of the life of the product or service, when all of the engineering, testing installation, integration and debugging problems have already been solved. Moreover, such surveys usually address only a particular product line of a supplier, rather than multiple or all product lines for that supplier.

The value of almost any satisfaction survey depends substantially on when the survey is conducted. It has been found, however, that satisfaction survey results obtained only after the deployment of the product or service usually do not provide an accurate view of supplier quality. By the time a post-deployment satisfaction survey is conducted and the results become widely available, memories have faded, details are forgotten, letters, documents and e-mails disclosing and discussing quality and performance issues, and the failures and successes that arose during the "pre-deployment" stage (i.e., before the product or service was finally ready for deployment) are often lost and/or forgotten. A division-level manager now basking in the glow (and obtaining the rewards) of being able to produce twice as many widgets, for instance, often forgets or underrates the impact of numerous engineering, testing, delivery and installation problems he had to endure before the responsible product or service was finally put into production.

Not surprisingly, then, snapshot survey results obtained only during post-deployment typically fail to tell the complete story of a supplier transaction and typically fail to shed light on many quality-related issues that could benefit from analysis and improvement. Moreover, because they represent only a snapshot measurement of quality during the post-deployment stage, conventional quality systems usually focus only on relatively obvious, short-term supplier performance issues, such as missed product or service delivery dates.

Another problem with customer satisfaction surveys is that they only ask the survey participants to grade, rank or assign a "score" to a quality or performance metric. As such, these surveys provide only quantitative results (e.g., discrete performance or quality "grades" or "scores") from the survey participants. But different individuals usually have different—sometimes substantially different—views and opinions when it comes to assigning a quantitative quality or performance grade to a particular product or service. Conduct or performance that one person considers "excellent," may be considered by another person—even another person who works very closely with the first person—as merely "acceptable." Thus, asking these two people to grade or rank the quality of a product or service on a scale ranging from "poor," "acceptable," "good," "very good" to "excellent," for example, sometimes leads to inadequate, confusing or misleading results. In this respect, even quantitative grades and scores can be very subjective.

Conventional supplier quality management systems and processes suffer from another problem in that they typically cannot be applied to the whole of a large organization or enterprise having a multiplicity of diverse sub-organizations, departments or divisions which obtain products and services from that supplier. Rather, they can only be applied at the level of the sub-organization, department or division that provides the data. Such sub-organizations, departments and, divisions may (and usually do) have substantially different quality requirements, grading systems and problem-reporting procedures. Consequently, the results of satisfaction surveys and/or quality reports produced by individual and diverse departments or divisions are not all that useful for measuring, managing and improving supplier quality across an entire organization, which makes it extremely difficult to generate concrete cross-organization level corrective action plans to improve supplier quality.

For all of these reasons, conventional supplier performance and quality management systems lack the continuity, consistency and objectivity required by most organizations to achieve significant, long-term supplier quality and performance improvements across the entire organization. Accordingly, there is a need for systems and methods for measuring and managing supplier quality and performance issues on a level appropriate for an entire organization or enterprise, and for the entire life of the product or service, including both the pre- and post-deployment stages. There is a further need for such systems and methods to incorporate both quantitative and qualitative data concerning quality and performance, as well as supplemental supplier performance indicators, such as the suppliers' compliance or noncompliance with critical contract provisions and diversity objectives associated with delivering the product or service. Further still, these methods and systems need to include components and processes for creating, tracking and resolving quality and performance corrective action plans on an on-going basis.

SUMMARY OF INVENTION

The present invention addresses these and other problems associated with conventional supplier quality and performance management systems. This invention comprises a process of measuring and managing supplier quality throughout the life of the product or service. It includes mechanisms for acquiring and managing qualitative and quantitative measurements during pre-deployment and post-deployment phases, together with contract and diversity compliance measurements, as well as logistics measurements, to provide for a comprehensive assessment of supplier accountability. The invention uses customer satisfaction surveys to bring customers' response into focus, and follows up with corrective action plans to establish a mutually beneficial supplier relationship. By repeating this process at regular intervals, the invention enables better management and continuous improvement of performance and quality of diverse product and service lines.

In general, the invention is a process and system for managing performance information in an organization for a supplied product or service. The process comprises the steps of: (1) identifying a set of performance metrics pertaining to a product or service, the set of performance metrics including both pre-deployment stage and post-deployment stage performance metrics; (2) receiving a division-level quantitative data point and a division-level qualitative data report for each performance metric from each division in the organization; (3) producing an organization-level quantitative score for the product or service responsive to the division-level quantitative data point; (4) producing an organization-level qualitative assessment for the product or service responsive to the division-level qualitative report; and (5) generating an overall performance score for the product or service responsive to the organization-level quantitative score and the organization-level qualitative assessment.

The pre-deployment stage in the life of a product or service may include multiple pre-production activities for the product or service, including without limitation, engineering, system testing, delivery, installation and integration. The post-deployment stage may include many or all other phases in the life of a product or service, including without limitation, operation, production, ramp-down, phase out and retirement. The set of performance metrics may include, for example, the degree of compliance with a key contract provision, the degree of compliance with a diversity commitment, the extent to which the product or service is broken, under repair, or otherwise unavailable, the degree to which the product or service failed to conform to design specifications, the extent to which repairs are required for related products as a result of receiving the product or service, the extent to which the product or service is delivered late, the extent to which the product or service fails during testing, the degree to which the product or service meets expectations, the reliability for the product or service, and the maintainability of the product or service. Other performance metrics known and used by those skilled in the art may also be used with the invention. The division-level quantitative data point may comprise, for instance, a grade, rank or score for a performance metric, or a value representing a count, price, cost, or period of time for a performance metric. The division-level qualitative data report may comprise responses to a customer satisfaction survey, for example, but it may also include anecdotal data and or personal experiences with the supplier or the supplied products or services.

In some embodiments, the identifying step includes the step of recognizing performance metrics already being used by a division, while other embodiments include defining new performance metrics for a division that are appropriate for use and analysis by an entire enterprise. In addition, the organization-level quantitative data point may be derived according to a specified grading criteria, such as an organization or enterprise-wide standard, an industry standard, or a government standard.

In some embodiments, the process includes the steps of determining which of the plurality of divisions possesses information related to the performance metric and establishing a procedure for collecting the division-level quantitative data point and the division-level qualitative data report from those divisions. Such collection procedures may optionally include "pre-processing" the quantitative and qualitative data in order to convert it to a format appropriate for the entire organization or enterprise. This pre-processing step frequently makes it unnecessary in some contexts for organizations and enterprises using the invention to impose new and unfamiliar data collection and formatting restrictions on the divisions who provide the quality and performance data.

Ideally, each division in the organization or enterprise that submits the quality and performance data concerning the supplied product or service also provides regular updates for the data according to a specified schedule, such as once per month, once per quarter, or upon reaching certain life-cycle milestones.

In another embodiment, the process further includes the step of receiving, for each performance metric in the set of performance metrics, a quantitative data point and a qualitative data report from the supplier, for both a pre-deployment stage and a post-deployment stage of the product or service life-cycle. In this embodiment, the invention takes into account the quantitative and qualitative views of the suppliers, as well as the views of those supplied. Still further, the process may include creating a summary based on the overall performance score and the organization-level quality assessment, distributing the summary to each division in the plurality of divisions, and receiving verifications and approvals of the summary from each division in the organization that participated in providing the underlying data. Preferably, the summary is then published on an interconnected data communications network, such as the Internet or on the organization or enterprise's intranet, with one or more user-activatible controls configured to display detailed quantitative and qualitative data in response to user input. The process may further include providing a copy of the summary to the supplier, and requesting a corrective action plan, which could then be approved and monitored by the organization.

In order to develop a complete picture of a supplier's performance record for a supplied product or service, the present invention, unlike conventional systems, incorporates supplemental performance indicators, such as the supplier's record of compliance with key contract provisions (e.g., delivery dates, response times, processing speeds, fitness for a particular purpose, etc.) and key diversity objectives (e.g., a minimum level of subcontracting with women and minority-owned businesses).

The invention also incorporates logistics into the supplier performance analysis. Logistics include supplied product and service attributes such as the total number of discrepancies, defects, freight and/or shipping issues that arise during the pre- and post-deployment stages of the product or service life-cycle. While these attributes rarely amount to a breach of contract, they quite frequently have a substantial impact on the quality and performance of the supplied product or service, and therefore should not be overlooked in a robust supplier performance management system. Accordingly, the process may also include the steps of identifying and collecting such supplemental performance and logistics data from the divisions of the organization, and including the data in the division-level and organization-level quantitative grades and qualitative reports.

In another aspect of the invention, an online supplier performance and accountability computer system for an organization is provided. The system comprises: (1) a first memory storage area having at least one region for storing a plurality of division-level quantitative grades provided by a plurality of divisions in the organization, the plurality of quantitative grades pertaining to a set of performance metrics for the supplied product or service; (2) a second memory storage area having at least one region for storing a plurality of division-level qualitative reports provided by the divisions, the plurality of division-level qualitative reports also pertaining to the set of performance metrics; (3) an executive user interface configured to receive input from a user identifying the supplier; and (4) an electronic report card generator configured to retrieve and display, responsive to the input received by the executive user interface, an organization-level quantitative score responsive to the division-level quantitative grade, and an organization-level qualitative report responsive to the division-level qualitative report. The first memory storage area and the second memory storage area may or may not be the same. At least a portion of the plurality of division-level quantitative grades and a portion of the division-level qualitative reports are provided by the plurality of divisions before the product or service is deployed.

In this aspect of the invention, the electronic report card generator may comprise a database management application server configured to retrieve the division-level quantitative grade from the first memory storage area and the division-level qualitative report from the second memory area. The electronic report generator may also include a Web server configured to display quantitative data and qualitative data to the user according to a standard protocol understood by the user's terminal device.

In some embodiments, the invention is configured to include a third memory storage area (which may or may not be the same as the first and second memory storage areas) having at least one region for storing an executive summary. In these embodiments, an administrative component is included to create the executive summary based on the plurality of division-level quantitative grades stored in the first memory storage area and the plurality of division-level qualitative reports stored in the second memory storage area, and to store the executive summary in the third memory storage area. The executive user interface is optionally configured to display the executive summary to the user at various levels of detail in response to user input and according to user preference.

A business logic processor may be included in the system to control aspects such as the exact timing supplier report cards are published and/or made available for users to review. It would be a business logic processor, for example, that prevents corrective action plans generated by suppliers from being published before they are approved by the organization.

The administrative component is further configured, in a preferred embodiment, to display a user-activatible document attachment control configured to attach an electronic document to the executive summary. With this functionality, for example, the user can attach electronic spreadsheets, images and text data to the executive summaries, which further explain or illustrate points included in the summaries. The system may further include, as part of the administrative component, for example, an authentication facility configured to determine whether the user is authorized to view or modify an executive summary, and a pre-processor configured to convert an original division-level quantitative grade or division-level qualitative report into a specified format prior to storing such data in the first or second memory storage areas.

In yet another aspect, a computer-readable storage medium encoded with a computer-executable program to display a supplier performance report card is provided. In a preferred embodiment, the supplier performance report card comprises a pre-deployment stage score, a post-deployment stage score, a logistics score and the results of a customer satisfaction survey. The pre-deployment stage score may comprise, for example, a value indicating a performance level for the product or service during a system integration, testing, engineering, delivery, or installation stage, while a post-deployment score may comprise a value indicating a level of performance achieved during a production or maintenance stage for the supplied product or service.

Alternatively, the supplier performance report card may comprise an organization-level quantitative score for a plurality of performance metrics pertaining to the supplied product or service, an organization-level qualitative report for the performance metrics, and an executive summary responsive to the organization-level quantitative score and the organization-level qualitative report. In this aspect, as in each of the other aspects, the plurality of performance metrics includes both a pre-deployment stage performance metrics and post-deployment stage performance metrics. In this case, the organization-level quantitative score is based on the division-level quantitative grades for the performance metrics, and the organization-level qualitative report is based on the division-level qualitative reports for the performance metrics.

The division-level quantitative grades and the division-level qualitative reports for the performance metrics may include responses to customer satisfaction surveys, and may be provided by the divisions both before, during and after the product or service is deployed. The division-level quantitative grades and the division-level qualitative reports may also constitute updates for prior division-level quantitative grades and prior division-level qualitative reports, respectively. The organization-level qualitative report may also be based on a plurality of customer satisfaction survey responses provided by a single division of the organization, or a plurality of customer satisfaction survey responses provided by a plurality of divisions of the organization.

In a preferred embodiment, the supplier performance report card may further include a request for a corrective action plan, in which case the program encoded in the storage medium may be further configured to display the request in response to an input by a user. The supplier performance report card may further include a corrective action plan, which can also be displayed to a user in response to input. Preferably, the program is further configured to display the division-level quantitative grades and/or the division-level qualitative reports underlying the requests and the corrective action plans in response to a selection of a user-activatible control displayed with the request or plan, or upon the entry of a sequence of characters by the user.

In embodiments, the supplier performance report card may further include a logistics report, a contract compliance report, a diversity compliance report, or a combination of two or more of these reports, which can also be displayed in response to the selection of a detail control or upon entry of a sequence of characters by the user.

In yet another aspect, the invention comprises a user interface for a supplier performance management system. The user interface includes a first display region comprising an executive summary of a supplier performance report card, where the executive summary includes an organization-level quantitative score, and an organization-level qualitative report for a performance metric pertaining to the product or service. A second display region in the user interface includes a user-activatible control configured to display a division-level quantitative grade, and a third display region includes a user-activatible control configured to display a division-level qualitative report. In this user interface, the organization-level quantitative score is based on the division-level quantitative grade, and the organization-level qualitative report is based on the division-level qualitative report. The division-level qualitative report preferably comprises a response to a customer satisfaction survey provided by a division of the organization. The user interface may further comprise a fourth display region comprising a user-activatible control configured to display a corrective action request or a corrective action plan.

FEATURES AND ADVANTAGES OF THE PRESENT INVENTION

It is a feature of the present invention that it provides real-time, interactive access to quality and performance measurements for supplied products and services for an organization having potentially many diverse divisions and many diverse methods of measuring and collecting quality and performance data.

It is another feature of the present invention in that it provides access to qualitative as well as quantitative supplier performance data.

It is a third feature of the invention that these measurements are collected, analyzed and published during both the pre-deployment and post-deployment stages of the life of the product or service, thereby providing a more accurate and complete picture of supplier performance.

It is another feature of the present invention that it provides a uniform standard for measuring supplier performance throughout a whole organization or enterprise.

It is yet another feature of the invention that it provides an electronic report card for a supplier that is accessible to users via an interconnected data communications network, such as the Internet or an intranet.

It is still another feature of the invention that users can view organization-level executive summaries of supplier quality and performance reports, and, if desired, drill down to view the supporting details, such as individual division-level quantitative grades or individual division-level customer satisfaction survey results.

It is still another feature of the invention that it provides a mechanism for attaching electronic documents, such as text files, spreadsheets, images, etc., to the executive summaries.

It is still another feature of the invention in that it provides for the creation, tracking and resolution of corrective action plans to improve supplier quality and performance.

It is still another feature of the invention that it incorporates measurements for logistics and supplemental performance indicators, such as contract and diversity compliance.

The present invention has significant advantages over conventional systems. Among other things, the invention provides a more accurate view of supplier performance because it incorporates pre-deployment quantitative and qualitative measurements and analysis, as well as post-deployment measurement and analysis. Moreover, the measurements and analysis are more consistent and trustworthy because they are received from a variety of internal sources and/or departments who work directly with the suppliers, and because each of these sources contributes directly to the overall quality and performance score. Another advantage of the invention is that it allows for collection of quality and performance data from a multiplicity of divisions or departments without dictating the format in which such data is collected and provided.

BRIEF DESCRIPTION OF THE FIGURES

FIGS. 3 through 7 depict exemplary graphical user interface screens that may be used in embodiments of the present invention to provide access to supplier performance electronic report cards.

DETAILED DESCRIPTION OF THE PREFERRED EMBODIMENTS

With reference now to the figures, a detailed discussion of certain embodiments of the present invention is presented. Notably, the present invention may be implemented using software, hardware or any combination thereof, as would be apparent to those of skill in the art. Accordingly, the illustrative figures and examples below are not meant to limit the scope of the present invention or its embodiments or equivalents.

Figure 1:
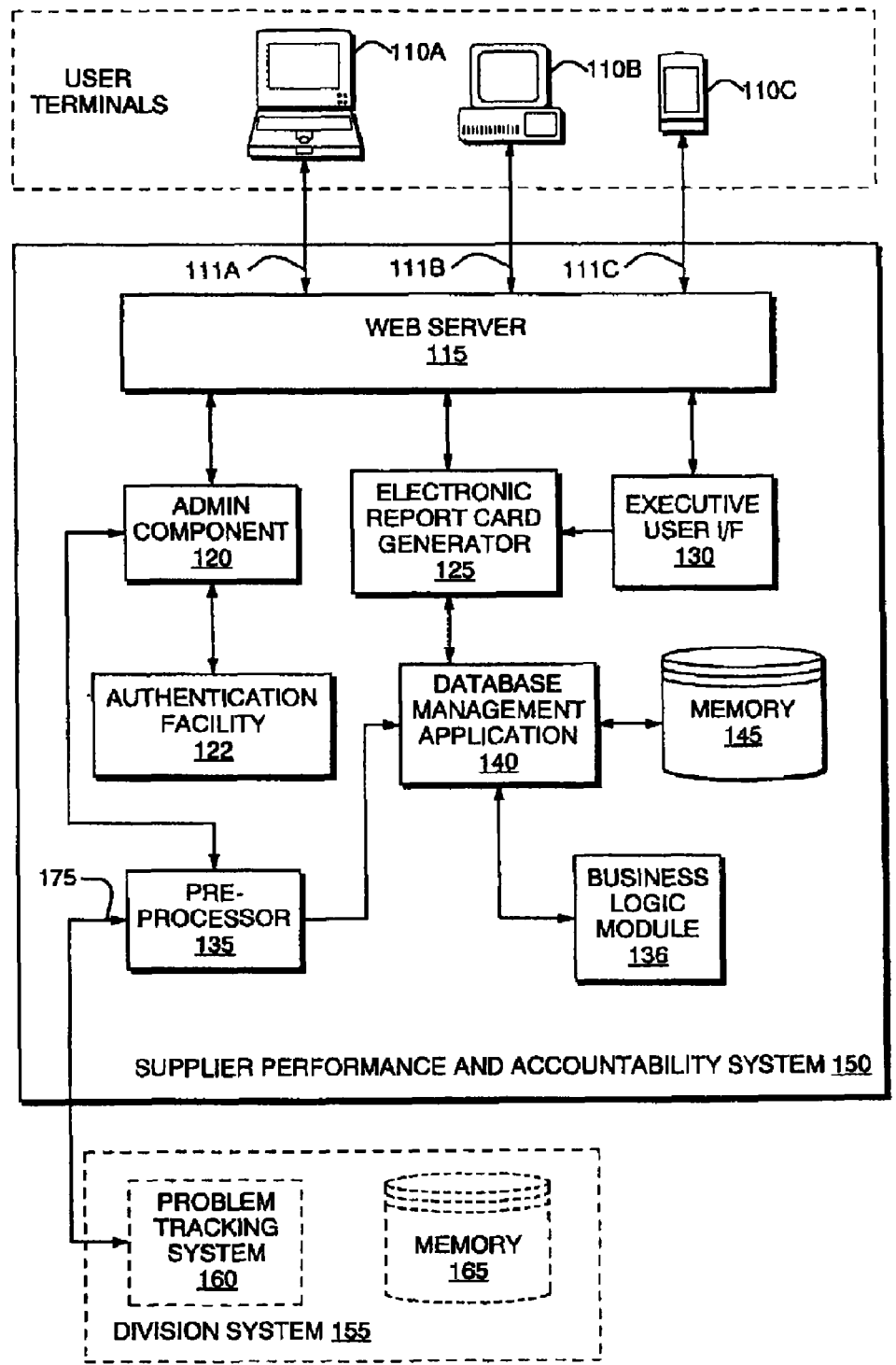
FIG. 1 shows a high-level block diagram of a supplier performance accountability system configured according to one embodiment of the present invention.

FIG. 1 shows a high-level block diagram of a supplier performance accountability system configured according to one embodiment of the present invention. In the embodiment depicted in FIG. 1, the Supplier Performance and Accountability System 150 comprises a Web Server 115, an Administrative Component 120, an Electronic Report Card Generator 125, an Executive User Interface 130, a Pre-processor 135, a Database Management Application 140, and a Memory 145. In a preferred embodiment, Supplier Performance and Accountability System 150 is coupled to and in communication with one or more division systems (shown as Division System 155 in FIG. 1) via Data Communications Path 175, and one or more user terminals (shown in FIG. 1 as User Terminals 110A, 110B and 110C) via Data Communications Paths 111A, 111B and 111C. Each of these components is described in more detail below.

Web Server 115 typically is a program that, using the client/server model and the World Wide Web's Hypertext Transfer Protocol (HTTP), serves the files that form Web pages to Web users (whose computers contain HTTP clients that forward their requests). Every computer on the Internet that contains a Web site must have a Web server program. In this case, users (such as organization executives) wishing to view electronic supplier report cards residing on Supplier Performance and Accountability System 150 log onto User Terminals 110A, 110B and 110C, and connect to Web Server 115 via Data Communications Paths 111A, 111B and 111C. In a preferred embodiment, Data Communication Paths 111A, 111B and 111C comprise wired Internet connections, wireless Internet connections, or both. A user terminal for accessing the system may comprise a personal laptop computer system or desktop computer system (shown as User Terminals 110A and 110B in FIG. 1), a web-enabled wireless telephone or personal digital assistant (shown as User Terminal 110C in FIG. 1), or any other web- or browser-enabled device configured to communicate with a Web server over a data communications network.

There are a variety of Web server programs available on the market that may be suitably adapted for use with the Supplier Performance and Accountability System 150 depicted in FIG. 1. The Web server program known as "Windows NT Server®," for instance, available from Microsoft Corporation (www.microsoft.com) of Redmond, Wash., is just one example of such a program. And although the components of Supplier Performance and Accountability System 150, as depicted in FIG. 1, may be located in the same physical computer system and accessed via a single Web server, such as Windows NT Server®, it should be apparent to one skilled in the art that these components also may be housed in physically separate computer systems, which may (or may not) exist at locations physically remote from each other. Such alternative configurations would not depart from the scope of the present invention. Web Server 115 may also be comprised of a combination of Web servers, application servers and database servers. For brevity and ease of understanding, however, such alternative combinations are not shown in FIG. 1.

Administrative Component 120 provides administrative user interface screens (such as the exemplary user interface screen described below with reference to FIG. 9) and functionality that allows administrative users of the system to perform administrative functions. Such administrative tasks may include, for example: (1) retrieving, reviewing, editing and publishing supplier performance report cards and the results of customer satisfaction surveys; (2) creating and modifying executive summaries; and (3) uploading and attaching supporting electronic documents, such as text files, images, spreadsheets; etc.

In a preferred embodiment, Administrative Component 120 would also include a user Authentication Facility 122, which would allow administrative users to configure and control a user's access to the system. Preferably, the authentication process is customized according to the particular products and services or the particular suppliers under consideration. Using methods and application programs known to those in the art, users are assigned various access rights depending on their individual responsibilities as they relate to receiving or using supplied products and services. In a preferred embodiment, initial access is provided upon "logging in" with a default password, which is then changed to a user-defined password for enhanced security. Upon authentication, various user-interface screens, applications and tools become available, depending on the users' defined access rights.

Similar to the Administrative Component 120, Executive User Interface 130 provides access to user interface screens, such as the exemplary user interface screens described below with reference to FIGS. 3-7, and functionality that allows users to log in and view electronic report cards for a supplier. Both Administrative Component 120 and Executive User Interface 130 are coupled to and in communication with Electronic Report Card Generator 125, which generates organization-level scores and reports based on the division-level quantitative and qualitative performance and quality data stored in and retrieved from Memory 145 by Database Management Application 140.

In practice, Electronic Report Card Generator 125 receives and interprets requests for supplier performance information from an administrative user via Administrative Component 120, or from an executive user via Executive User Interface 130, and sends those requests to Database Management Application 140. Using standard database querying methods known to those of skill in the art, Database Management System 140 retrieves the appropriate division-level quantitative and qualitative data from Memory 145 and passes it back to Electronic Report Card Generator 125, where it is compiled and formatted into a supplier report card. Electronic Report Card Generator 125 then passes the supplier report card to Web Server 115, where it is formatted into a Web page (hyper-text markup language) and transmitted to User Terminals 110A, 110B and 110C via Data Communications Paths 111A, 111B and 111C.

The system may also include a Business Logic Processor 136, which may be located in Electronic Report Card Generator 125, Database Management Application 140, or elsewhere in the system. Such a business logic processor might be configured, for example, to prevent creation of an executive summary before all of the divisions who need to contribute quantitative and qualitative data to Memory 145 have provided division-level performance data.

Pre-processor 135 is an optional component of Supplier Performance and Accountability System 150, which, if necessary, converts quantitative data points and qualitative data reports from the format used by the division providing the data into a format acceptable to Supplier Performance and Accountability System 150, and, more specifically, to a format expected by Database Management Application 140. Suppose, for example, Division System 155 in FIG. 1 has installed and uses its own quality and performance problem tracking apparatus (comprising Memory 165 and Problem Tracking System 160 in FIG. 1), which produces reports containing quality and performance data, some of which is required by Supplier Performance and Accountability System 150 to produce organization-level supplier report cards. In a preferred embodiment, Pre-processor 135 may be configured and programmed with intelligence, through the use of filters, templates and parsing algorithms, for example, to receive via Data Communications Path 175 a division-specific supplier performance report generated by Problem Tracking System 160 of Division System 155, to parse the division-specific performance report, and to create a new performance report containing only the data required by Supplier Performance and Accountability System 150. The new report, or perhaps just the data from the new report, may then be stored in Memory 145 by Database Management Application 140, and retrieved later for viewing and analysis under the control of Electronic Report Card Generator 125. Preferably, Division System 155 is configured to provide, and Supplier Performance and Accountability System 150 is configured to receive, such division-specific supplier performance reports on a regular basis throughout the entire life for the product or service in question, including both the pre-deployment and post-deployment stages. The operation of a pre-processor, according to one embodiment of the present invention, is described in more detail below with reference to FIG. 10.

It should be noted that although they are shown as separate physical components in FIG. 1, the Supplier Performance and Accountability System 150 could be implemented by combining Administrative Component 120, Electronic Report Card Generator 125, Executive User Interface 130, Pre-Processor 135, Database Management Application 140 and business logic processor (not shown) into one program or processor.

In preferred embodiments, supplier report cards may also be accessed and/or downloaded through a file transfer protocol (ftp) port (not shown in FIG. 1) in Supplier Performance and Accountability System 150. Thus, not all of the supplier report cards provided by the system are delivered through Web Server 115. If User Terminal 110B, for example, has installed a standard ftp client, and is therefore capable of sending an ftp download request, then the system will respond by transmitting an electronic report card to User Terminal 110E via an ftp connection over an ftp port. In preferred embodiments, the division-specific performance reports received from Division System 155, for example, may also be transferred to Supplier Performance and Accountability System 150 via an ftp connection.

Figure 2:
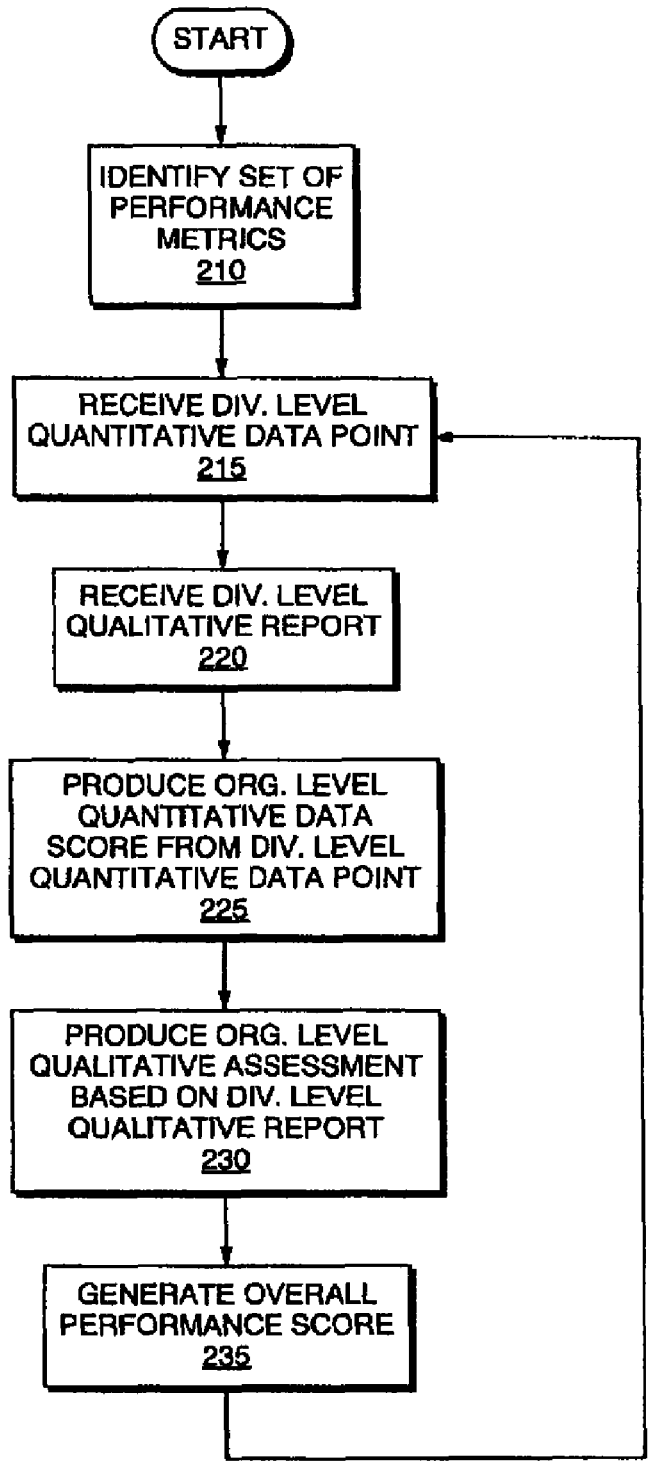
FIG. 2 depicts a flow diagram illustrating the steps performed in an embodiment of the present invention.

FIG. 2 contains a high-level flow diagram illustrating the steps performed in an embodiment of the present invention to generate an overall performance score. First, in step 210, a set of performance metrics pertaining to the product or service in question is identified. The set includes both pre- and post-deployment performance metrics so that performance may be evaluated from the perspective of the entire life of the product or service. Table 1 below, for instance, illustrates the kind of pre- and post-deployment performance metrics that may be identified in this step, as well as examples of grading criteria that could be used, as described below, to generate organization-level grades for such metrics in an embodiment of the invention.

TABLE 1

Performance Metrics and Grading Criteria

| Category | Measurement | Description | Guideline |
|---|---|---|---|
| Pre-Deployment: SIT | Lab entry - delivery | | A - if delivery met original date committed by vendor. |
| | | | B - if delivery is within 2 weeks of original date committed by vendor. |
| | | | C - if delivery is within 3 weeks of original date committed by vendor. |
| | | | D - if delivery is within 4 weeks of original date committed by vendor. |
| | | | F - if delivery exceeds 4 weeks of original date committed by vendor. |
| Pre-Deployment: SIT | Lab entry - test results | | A - if all lab entry checklist items are met. |
| | | | B - if in the test team's view only minor deviations are noted. All major deliverables (release notes, test plans, etc.) are met. |
| | | | C - if only 1 major item is not met. |
| | | | D - if more that 1 major item is not met. |
| | | | F - if product is rejected. |
| Pre-Deployment: SIT | Lab entry - responsiveness | | A - if vendor consistently exceeds expectations with respect to the relevant responsiveness dimensions |
| | | | B - if vendor consistently meets expectations with respect to the relevant responsiveness dimensions |
| | | | C - if vendor is inconsistent in their various responses |
| | | | D - if vendor appears to try very hard and expend effort, but is generally ineffective in many responsiveness dimensions |
| | | | F - if vendor is chronically poor in setting and meeting expectations in the relevant responsiveness dimensions |
| Pre-Deployment: SIT | Testing cycles - delivery | | A - if delivery met original date committed by vendor. |
| | | | B - if delivery is within 2 weeks of original date committed by vendor. |

TABLE 1-continued

| Category | Measurement | Description | Guideline |
|---|---|---|---|
| | | | C - if delivery is within 3 weeks of original date committed by vendor.
D - if delivery is within 4 weeks of original date committed by vendor.
F - if delivery exceeds 4 weeks of original date committed by vendor. |
| Pre-Deployment: SIT | Testing cycles - test results | | A - if product has no troubles that would prevent deployment or cause Operations workarounds (There are no critical or major troubles. The release submitted makes it to field deployment.)
B - if product makes it to field deployment with no critical troubles, but requires an Operations workaround(s). (There are no critical troubles but there are one or more major troubles requiring workarounds). The release submitted makes it to field deployment.
C - if product makes it to field deployment with one critical trouble that requires an acceptable Operations workaround. (There is one critical and/or majors but workarounds enable field deployment).
D - if product has at least one critical trouble without an effective Operations workaround such that deployment is prevented until the vendor provides an additional release for testing. (There are critical or major troubles which prevent field deployment).
F - if significant features are not functioning, troubles are numerous, and/or product stability is such that SIT would not recommend advancement to field test or FOA. (There are numerous critical and or major troubles and the system under test requires major re-work). |
| Pre-Deployment: SIT | Testing cycles - responsiveness | | A - if vendor consistently exceeds expectations with respect to the relevant responsiveness dimensions
B - if vendor consistently meets expectations with respect to the relevant responsiveness dimensions
C - if vendor is inconsistent in their various responses
D - if vendor appears to try very hard and expend effort, but is generally ineffective in many responsiveness dimensions
F - if vendor is chronically poor in setting and meeting expectations in the relevant responsiveness dimensions |

TABLE 1-continued

Performance Metrics and Grading Criteria

| Category | Measurement | Description | Guideline |
|---|---|---|---|
| Pre-Deployment: SIT | Documentation | | |
| Pre-Deployment: EFI | % Jobs w/out Service Outages | % jobs without outages out of total jobs | Weight: 15%<br>A = 100%<br>B >= 99.75%<br>C >= 99.50%<br>D >= 99.00%<br>F < 99.00% |
| Pre-Deployment: EFI | Audits - Verizon | % conforming audits out of total audits by Verizon | Weight: 10%<br>A >= 95.75%<br>B >= 88%<br>C >= 82%<br>D >= 76%<br>F < 76% |
| Pre-Deployment: EFI | Audits - Vendor | % conforming audits out of total audits by Vendor | Weight: 5%<br>A >= 95.75%<br>B >= 88%<br>C >= 82%<br>D >= 76%<br>F < 76% |
| Pre-Deployment: EFI | Specs & Central Office Records @ GMOP | % specs and CO records out of total jobs | Weight: 10%<br>A >= 95.75%<br>B >= 88%<br>C >= 82%<br>D >= 76%<br>F < 76% |
| Pre-Deployment: EFI | Specs & CO Records @ GMOP Not Requiring Changes | % specs and CO records requiring no changes out of total jobs | Weight: 10%<br>A >= 95.75%<br>B >= 88%<br>C >= 82%<br>D >= 76%<br>F < 76% |
| Pre-Deployment: EFI | End of Job Survey Received | % surveys received out of total surveys | Weight: 5%<br>A >= 95.75%<br>B >= 88%<br>C >= 82%<br>D >= 76%<br>F < 76% |
| Pre-Deployment: EFI | End of Job Survey Results | % jobs conformed out of total surveys | Weight: 15%<br>A >= 95.75%<br>B >= 88%<br>C >= 82%<br>D >= 76%<br>F < 76% |
| Pre-Deployment: EFI | % Orders Completed on Time | % orders completed on time out of total orders | Weight: 30%<br>A >= 95.75%<br>B >= 88%<br>C >= 82%<br>D >= 76%<br>F < 76% |
| Post-Deployment: | Customer Availability - Supplier Attributable (a) Customer Outage Minutes, (b) Total Minutes of Availability, % Availability = (1 − a/b) * 100 | 1. Customer outage minutes per month. 2. Total Minutes of Availability per month. 3. Percentage of Availability. | A = 99.999-100%<br>B = 99.998%<br>C = 99.997%<br>D = 99.996%<br>F < 99.996% |
| Post-Deployment: | Maintainability - Responsiveness of Technical Support. Number of Problem Reports (NPR) - % of critical and major problems closed on time. % time meets requirements. % reports closed/ due to be closed. | Problem reports can include written problem reports, billing and maintenance capabilities, telephone calls that are directly entered as a problem report. Any report of a problem after general availability of each release regardless of whether related to hardware, software, documentation, no trouble found, procedural or duplicate. | A = 100%<br>B = 95-99.9%<br>C = 90-94.9%<br>D = 85-89.9%<br>F < 85% |
| Post-Deployment: | Feature Availability: # Critical and/or High Priority Features where Supplier not in Sync with Verizon Needs - | # Critical and/or High Priority Features where Supplier not in sync with Verizon needs - As per Service and Architecture Features Schedule of | A = 0<br>B = 1<br>C = 2<br>F > 2 |

TABLE 1-continued

Performance Metrics and Grading Criteria

| Category | Measurement | Description | Guideline |
| --- | --- | --- | --- |
| | As per Service and Architecture Features Schedule of Deliverables | Deliverables | |
| Post-Deployment: | Reliability - Initial Return Rates (IRR): (a) Circuit Pack Returns, (b) IRR Population, (c) Actual Initial Return Rate, (d) Predicted Return Rate. (a/b) * 100 = c, percent of Circuit Pack Types having (c) less than (d) | Initial Return Rate (IRR) for units shipped 1 to 6 months. Determine the percentage of up to 5 circuit pack types with the highest return rate for a three-month period (current month and previous 2 months) ending in the report month. Each circuit pack on the list must have had at least 9 during the three-month period. | Percent of Circuit Pack types with actual return rate less than predicted return rate: A = 100% or zero return rate B = 80-99% C = 60-79% D = 40-59% F = 0-39% |
| Post-Deployment: | Reliability - One Year Return Rates (YRR): (a) Circuit Pack Returns, (b) YRR Population, (c) Actual Yearly Return Rate, (d) Predicted Return Rate. (a/b) * 100 = c, percent of Circuit Pack Types having (c) less than (d) | One Year Return Rate (YRR) for units shipped 7 to 18 months. Determine the percentage of up to 5 circuit pack types with the highest return rate for a three-month period (current month and previous 2 months) ending in the report month. Each circuit pack on the list must have had at least 12 returns during the three-month period. | Percent of Circuit Pack types with actual return rate less than predicted return rate: A = 100% or zero return rate B = 80-99% C = 60-79% D = 40-59% F = 0-39% |
| Post-Deployment: | Feature Patch Quality (FPQ 0): The most recent dominant release reported. (a) # defective feature patches per month, (b) Total # feature patches available for general release for most recent dominant release reported. c = (1 − a/b) * 100 | Feature Patch Quality is the percentage of offical feature patches that are determined to be defective. | A = 97.00-100% B = 93.00-96.99% C = 89.00-92.99% D = 85.00-88.99% F < 85.00% |
| Post-Deployment: | Reliability - # of FCC events, Supplier attributable: 1 monthly failure or more = F; 30,000 or greater lines OOS (Out of Service) for 30 minutes or greater. | 1 monthly failure or more =F; 30,000 or > lines OOS (Out of Service) for 30 minutes or greater | A = 0 FCC event F >= 1 FCC event |
| Post-Deployment: | Software Update Quality (SWU 0) - The most recent dominant release reported. This measurement is used to evaluate the level of defective software updates with the goal of minimizing associated risks. | A variety of new products have been developed that use an alternative approach to install new generic/releases and maintenance software (point or dot releases) into the product. SW updates replaces the existing code with new software. The mechanism used to install the generic/release and the point or dot releases are essentially the same. SW Update Quality (SWU) quantifies the percentage of updates that are defective. | A = 97.00-100% B = 93.00-96.99% C = 89.00-92.99% D = 85.00-88.99% F < 85.00% |

Next, in steps 215 and 220, respectively, a division-level quantitative data point (such as the number of system outages for the product or service) and a division-level qualitative report (such as anecdotal comments about the testing or installation of a product or service, or the results of a customer satisfaction survey) are received from one or more divisions in the organization. Ideally, the quantitative data point and the qualitative data reports are received by means of a data communications path in an interconnected data communications network, such as the one depicted in FIG. 1. The data may also be delivered by more traditional means, however, such as by typed reports delivered by hand or mail, for instance, without departing from the scope of the present invention.

An organization-level quantitative score is then produced from the division-level quantitative data point, step 225. In a preferred embodiment, this step is accomplished by processing the division-level quantitative data point according to a grading criteria provided by the organization, the industry as a whole, or a local or national government or regulatory body, such as the Federal Communications Commission. The grading criteria may specify, for instance, that a certain number of critical or major problems associated with the product or service that were resolved within a specified maximum time frame warrants a grade of "A." See the column entitled "Guidelines" in Table 1, above, for examples of grading criteria that could be used for these purposes in an embodiment of the invention.

The effect of this step, essentially, is to generate quantitative performance data that is "normalized" according to a standard set of business requirements that spans an entire organization, not just one division. Performing this step provides a way to reconcile problems created by receiving performance grades for the same metrics from two divisions that use different grading scales. If a division submits grades using a grading scale of "0" to "10," for example, performing this step converts such grades to the organization-level grading scale, which might be on a scale of "A" to "F." So, essentially, this step results in the generation of quantitative data points, such as grades, that are meaningful, from a relative standpoint, for the entire organization.

While the processing of the division-level data points according to a specified grading criteria like the criteria depicted in Table 1 above may be performed by a human being without departing from the scope of the present invention, an automated processor operating under the control of grading criteria provided in an electronic template (i.e., a spreadsheet) is the preferred method. Such electronic templates and processors may be incorporated, for example, in Pre-processor 135, which was discussed above with reference to FIG. 1. Indeed, multiple and distinct templates may be used in cases where different divisions have different quality and performance requirements. By installing these templates in a processor running at the organization level, divisions would not be required to change their performance and quality data collection procedures in order to participate in the organization-wide supplier quality analysis.

Returning now to FIG. 2, the next step, step 230, is to produce an organization-level qualitative assessment based on the division-level qualitative report provided by the division. This step is accomplished, for example, by obtaining responses to customer satisfaction surveys, by obtaining specific anecdotal comments and opinions from users of the product or service, by collecting information concerning the current status of key provisions of the product or service contract, by collecting information from the supplier concerning its compliance with diversity objectives, by analyzing trends evident from the responses to the customer satisfaction surveys, by collecting details (beyond the hard numbers) concerning product or service outages, and by identifying and following up on missing and/or inconsistent quantitative data points. Table 2 below illustrates the types of questions that could be asked in a customer satisfaction survey utilized in an embodiment of the present invention.

TABLE 2

Sample Customer Satisfaction Survey Questions

| | |
|---|---|
| Customer Satisfaction Survey Question No. 1 | What rating best describes the level of satisfaction relative to this supplier consistently meeting product requirements (includes system availability, hardware reliability, number of trouble reports, and/or number of software patches/defective patches) |
| Customer Satisfaction Survey Question No. 2 | What rating best describes the level of satisfaction relative to this supplier communicating product or service changes to you in a timely manner (product or service related)? |
| Customer Satisfaction Survey Question No. 3 | What is your level of satisfaction with Product Quality received from this supplier? |
| Customer Satisfaction Survey Question No. 4 | What is your current level of satisfaction with the supplier's ability to meet your present requirements (includes delivery/system turnover, and invoice accuracy and timeliness) |
| Customer Satisfaction Survey Question No. 5 | What rating best describes this supplier's product evolution process to meet your needs (including the development and introduction of new product and/or software features/releases, etc.)? |
| Customer Satisfaction Survey Question No. 6 | What rating best describes this supplier's service support (inside sales, customer service and technical support, including response to issues during emergencies and resolution time)? |
| Customer Satisfaction Survey Question No. 7 | Was the supplier in "Default" of this contract? |
| Customer Satisfaction Survey Question No. 8 | Was the supplier in noncompliance with any of the "Critical Contract Provisions"? |
| Customer Satisfaction Survey Question No. 9 | Has this supplier agreed to all of the Critical Contract Provisions as part of their current contract? |

By combining and cross-checking all of these qualitative elements with qualitative data received from other divisions concerning the same product or service, a single qualitative assessment that takes all these factors into account is produced. Although not required, this step may be performed by a human being having experience with the divisions providing the division-level qualitative reports, and/or experience with the suppliers, products or services in question.

As illustrated by step 235 in FIG. 2, the next step is to generate an overall performance score for the supplier based on the organization-level quantitative score and the organization-level quality assessment produced in steps 225 and 230. The overall performance score is typically embodied in an executive summary of the quantitative and qualitative data provided by the divisions.

Finally, as illustrated by FIG. 2, each of the above steps is repeated on a regular basis throughout the entire life of the product or service. How frequently these steps should be repeated typically depends on the quality and performance requirements of the organization using the invention.

Figure 3:
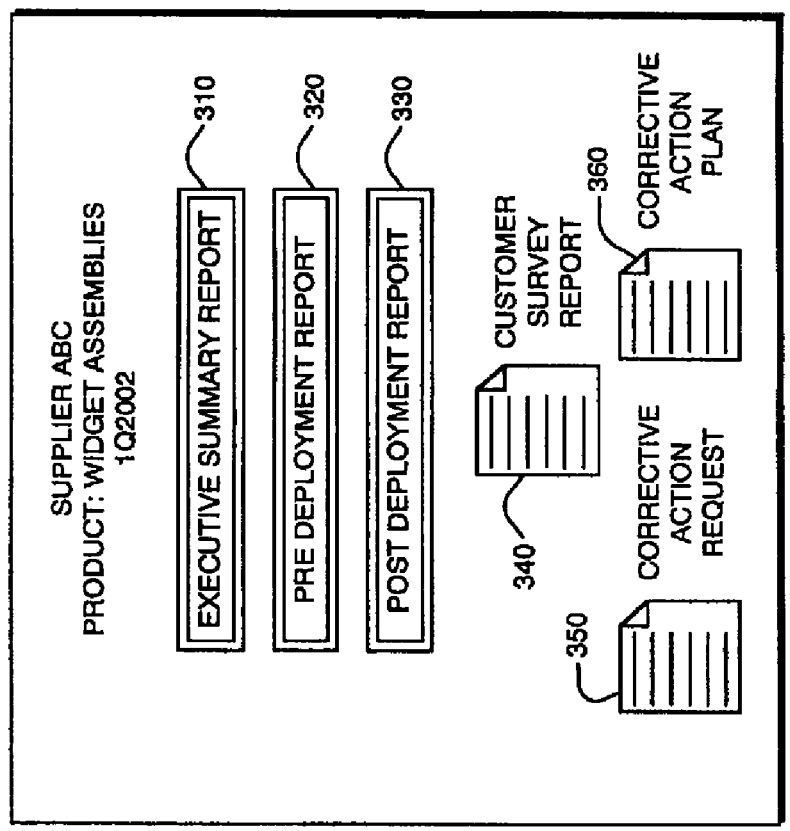

FIGS. 3 through 7 depict exemplary user interface screens that may be displayed in embodiments of the present invention to provide access to the supplier performance report cards generated by, for example, Electronic Report Card Generator 125 in FIG. 1. FIG. 3, for instance, shows an introductory screen containing buttons configured to display an executive summary performance report (Button 310), a pre-deployment performance report (Button 320), a post-deployment performance report (Button 330), the results of a customer satisfaction survey (Button 340), a corrective action request (Button 350) and a corrective action plan (Button 360).

Figure 4:
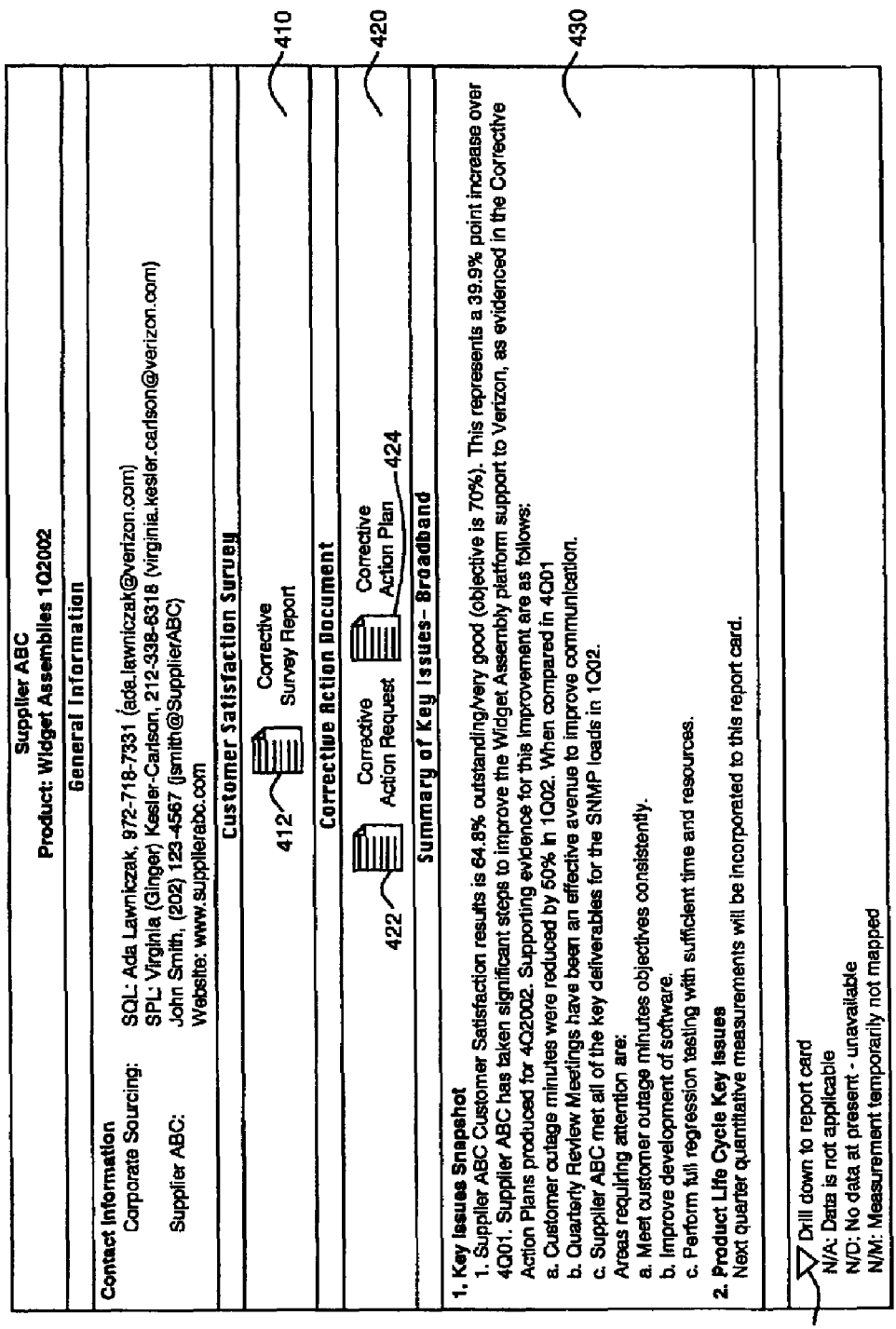

FIG. 4 depicts an example of a user interface screen containing an executive summary according to the present invention. This screen contains at least three regions, each configured to provide performance information or access to performance information concerning a supplied product or service. In this example, Region 410 provides a control (Button 412) configured to display the results of a customer satisfaction survey. An example of such results is shown in the report depicted in FIG. 8. Region 420 contains controls (Buttons 422 and 424) configured to display corrective action documents (i.e., the corrective action request and a corrective action plan). Region 430 of the user interface screen in FIG. 4 shows an example of an executive summary concerning the performance of a supplier. Notably, a control (Button 440) is also provided, which allows the user to drill down to user interface screens containing more detailed quantitative and qualitative data.

FIGS. 5 and 6 show exemplary user interface screens for displaying organization-level data for both quantitative and qualitative pre-deployment measurements for a supplied product or service. These screens contain quantitative data points (i.e., grades), indicated in FIG. 5 by reference number 510, and qualitative data, indicated in FIG. 5 by reference number 520. FIGS. 5 and 6 also show how certain user interface screens may contain user-activatible buttons (reference number 530 in FIGS. 5 and 610 in FIG. 6) configured to display additional quantitative and qualitative data to the user, if selected. FIG. 7 shows an exemplary user interface screen for displaying quantitative and qualitative post-deployment measurements. Similar to FIGS. 5 and 6, this screen also contains controls (710) configured to show more detailed data upon selection by a user.

Figure 8:
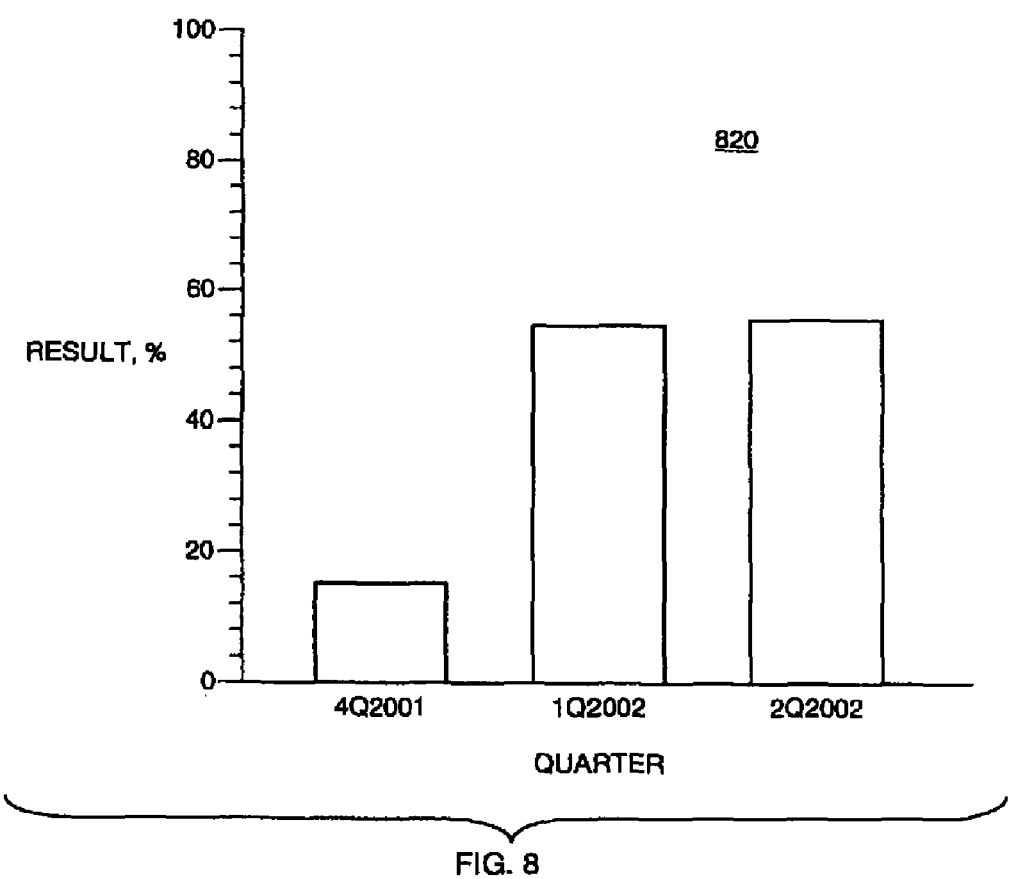
FIG. 8 depicts an exemplary format for a customer satisfaction survey report generated by an embodiment of the present invention. In this example, the report contains both a table and a graph illustrating trends in customer satisfaction survey results for a particular quarter.

FIG. 8 shows examples of the kind of tables (810) and charts (820) that could be used with the present invention to display qualitative data or summaries of qualitative data provided by the divisions. In this example, the table (810) and chart (820) summarize the percentage of the number of survey responses marked "Outstanding" or "Very Good."

Figure 9:
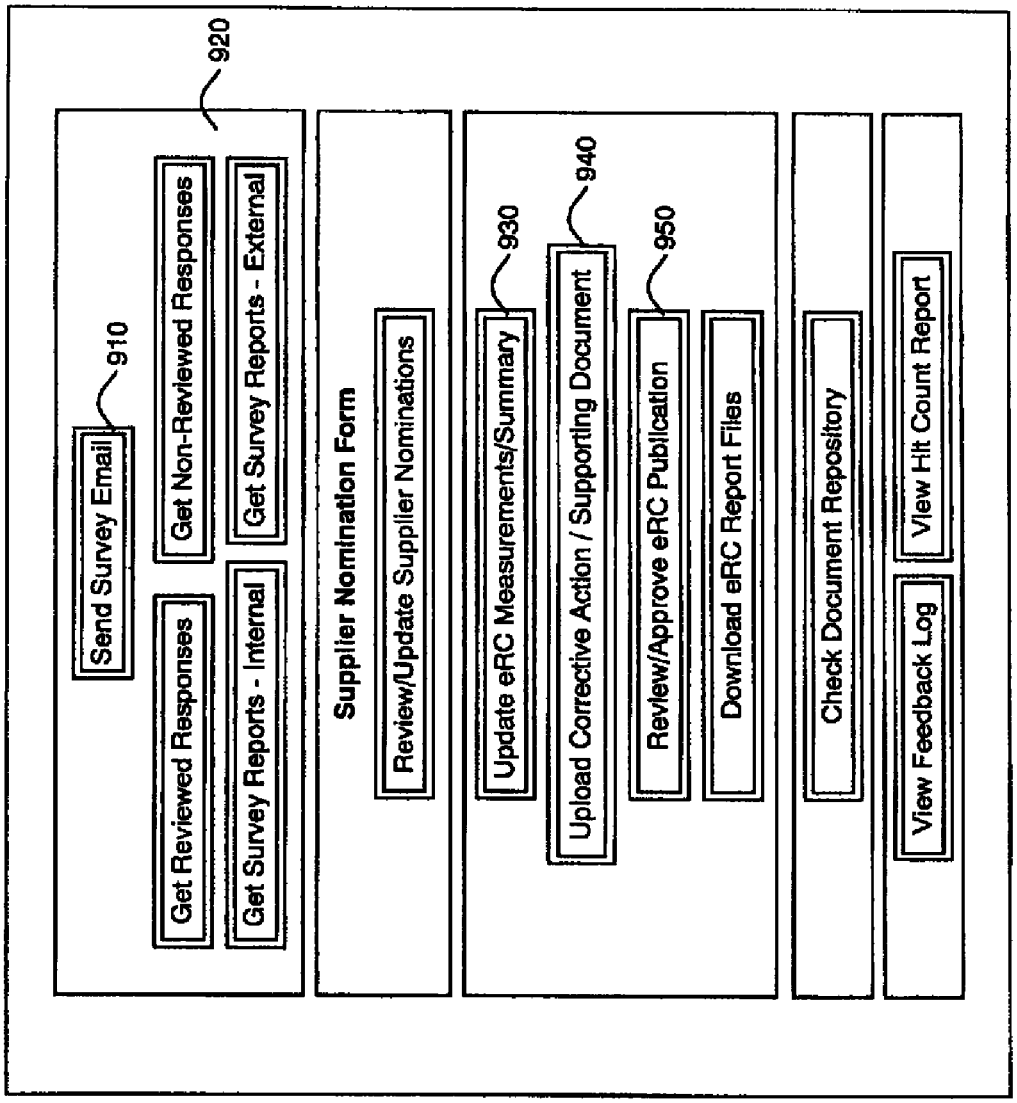
FIG. 9 depicts an exemplary graphical user interface screen for the administrative component of an embodiment of the present invention.

FIG. 9 illustrates an example of a user interface screen that might be generated by an administrative component of a supplier performance and accountability system configured in accordance with the present invention. As shown in FIG. 9, this screen contains controls and buttons that, among other things, allows the user to send emails (910), retrieve and review survey responses (920), update performance metric measurements and summaries (930), upload corrective action plans and supporting documents (940) and to review and approve publication for supplier performance report cards (950).

Figure 10:
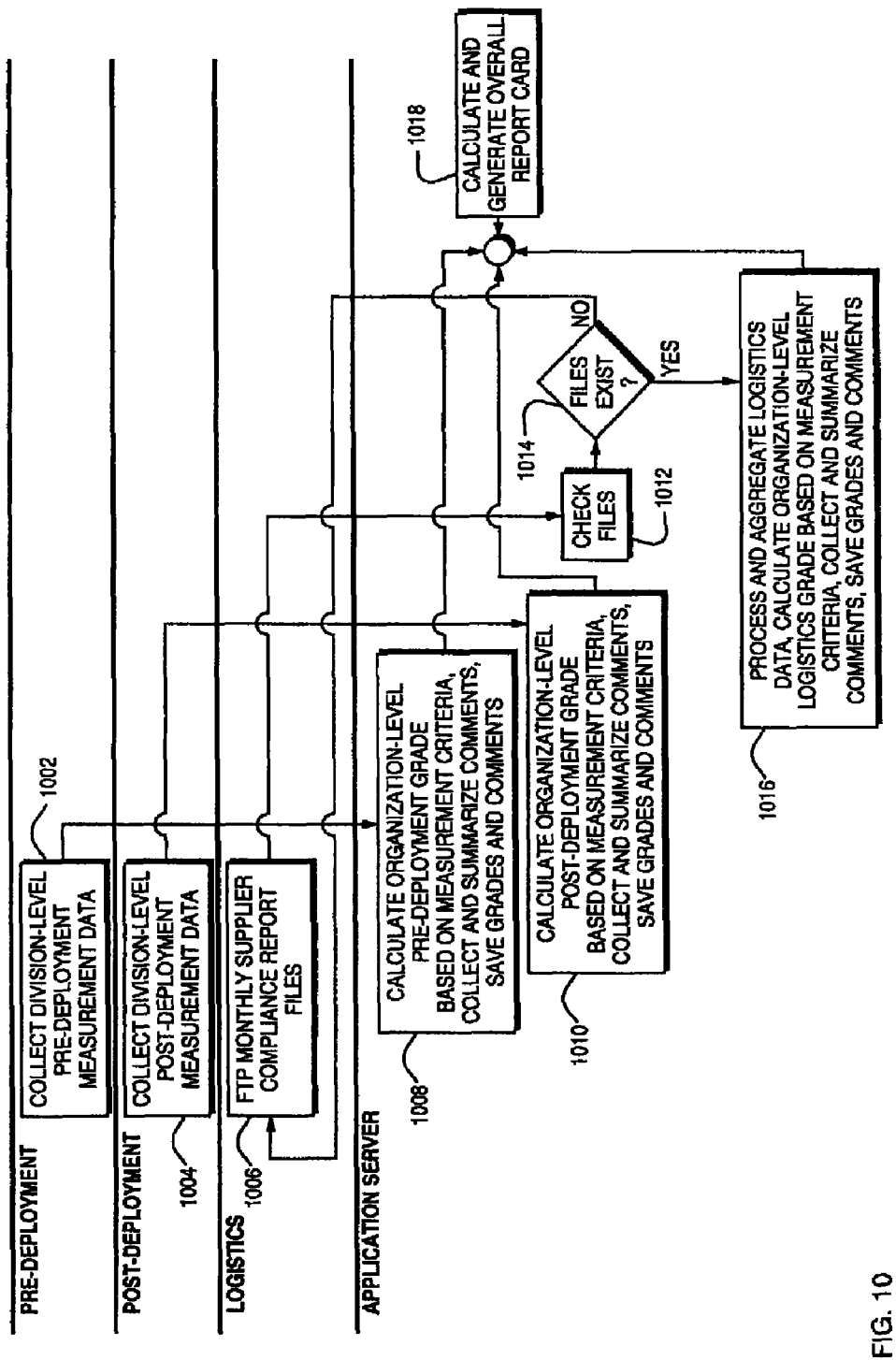
FIG. 10 depicts a process flow diagram illustrating the flow of data and the steps performed by a system configured to operate in accordance with one embodiment of the present invention, particularly with respect to pre-processing pre- and post-deployment measurement data.
Figure 11:
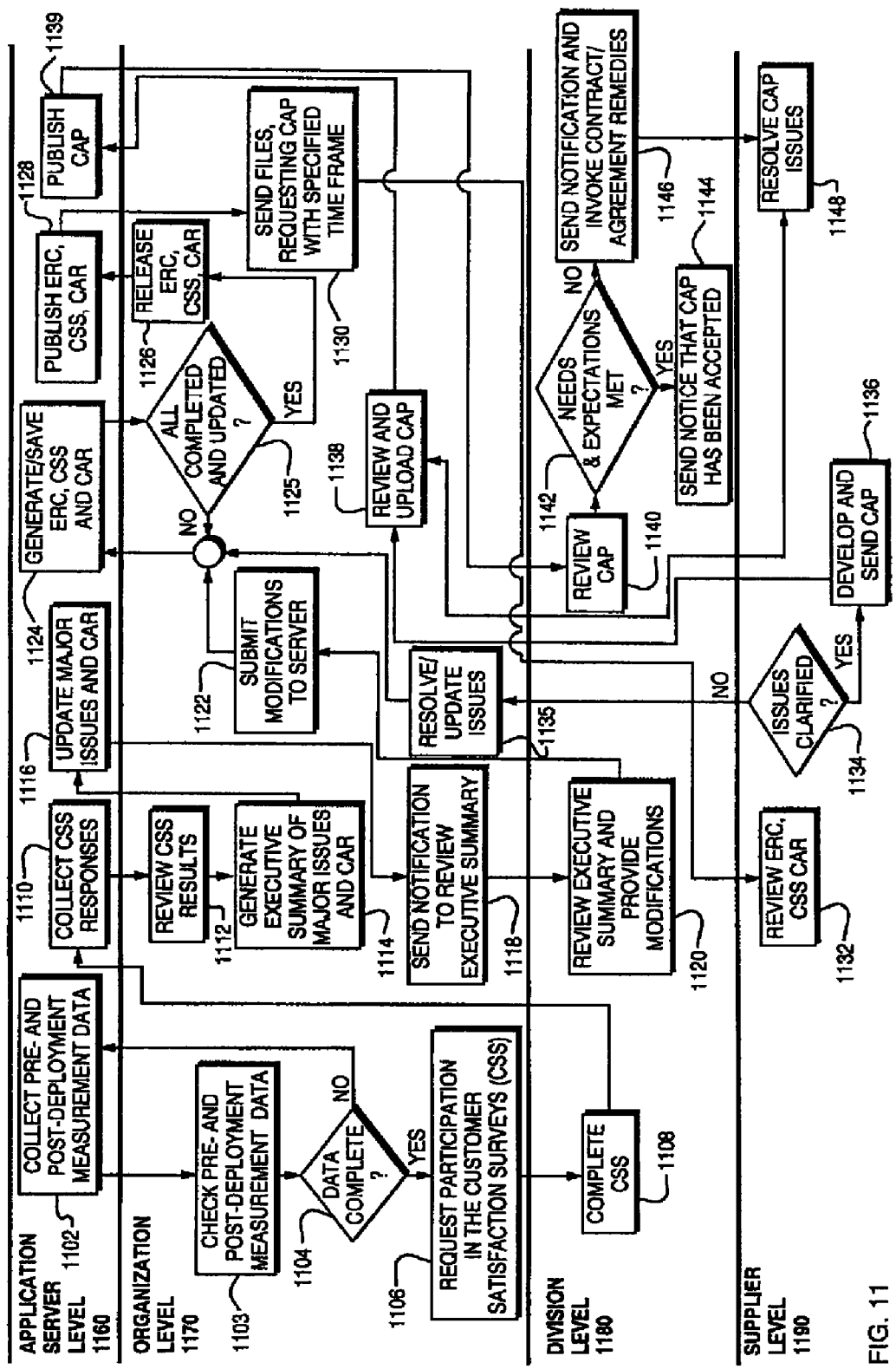
FIG. 11 depicts a process flow diagram illustrating the flow of data and the steps performed in collecting and processing responses to customer satisfaction surveys and corrective action plans according to an embodiment of the present invention.
Figure 12:
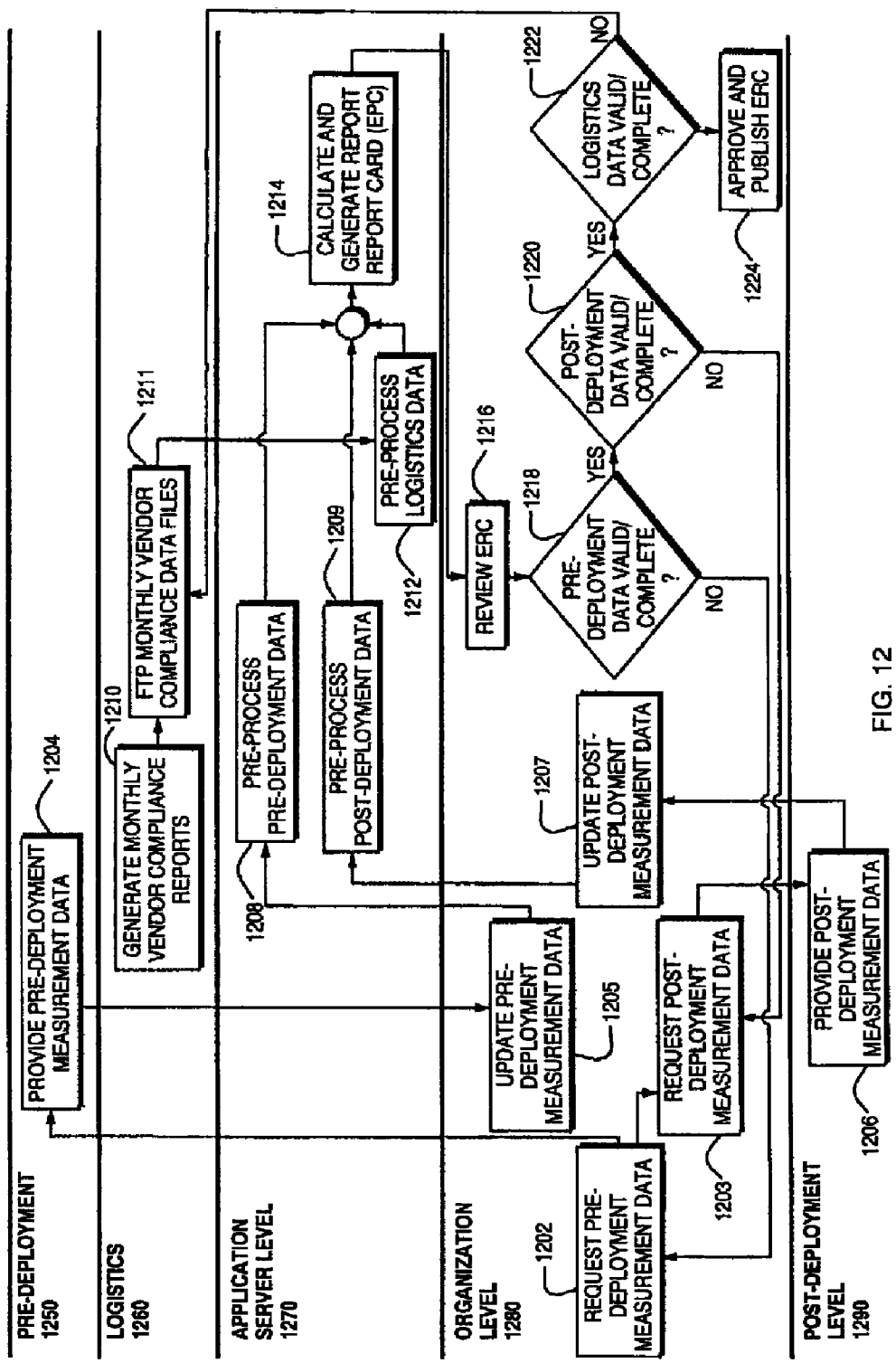
FIG. 12 depicts a process flow diagram illustrating the overall operation and flow of data in a supplier performance and accountability system configured to operate in accordance with the present invention.

With reference to FIGS. 10, 11 and 12, a more detailed description of the flow of data and the steps performed in a supplier performance and accountability system of the present invention is now provided.

FIG. 10 illustrates, for example, the flow of data and the steps performed by a supplier performance and accountability system (such as Supplier Performance and Accountability System 150 described above with reference to FIG. 1), with particular focus on the steps performed by Pre-processor 135. First, at step 1002, during a pre-deployment stage in the life of the product or service, division-level performance measurement data for the product or service is collected, preferably from each division in the organization that receives or uses the product or service in question. The pre-deployment performance measurement data is transferred to an application server typically serving as a host for the supplier performance and accountability system. As illustrated in FIGS. 5 and 6, such pre-deployment performance measurement data may include, for example, quantitative and qualitative division-level grades the product or service achieved during testing for the product or service. The data may be collected through electronic means, such as transmitting electronic reports via one or more data communications network connections between a division-level problem reporting/quality control computer system and the application server, or through more traditional means, such as by compiling and delivering to the organization one or more written reports, which are then manually entered on the application server. As illustrated at step 1004 of FIG. 10, performance measurement data generated during a post-deployment stage (e.g., grades the product or service achieved after deployment in areas such as availability, maintainability and reliability, as shown in FIG. 7) are also collected (preferably from each division in the organization) and transmitted to the application server hosting the supplier performance and accountability system.

In a preferred embodiment, and as shown at step 1006, logistics performance data, embodied, for example, in supplier compliance report files, are also transmitted from the divisions to the application server (over an ftp connection, for instance) on a monthly basis. Logistics performance data may include supplier compliance reports concerning incorrect or improper product or service labeling and packaging, misdirected or late product or service deliveries, shipping damage, etc.

When the division-level pre-deployment and post-deployment grades are received on the application server, the next steps (steps 1008 and 1010 in FIG. 10) are to calculate organization-level pre- and post-deployment grades, collect and summarize qualitative data (such as comments and opinions of individual subject matter experts in the divisions who work with the supplied products or services), and save such grades, comments and opinions on the server. The organization-level pre- and post-deployment grades may be based on, for example, standard measurement criteria established by the organization, the industry as a whole, or even the government. In some embodiments, collecting and summarizing qualitative data, such as the comments and opinions of subject matter experts in the divisions, may be performed by a human quality expert in the organization.

The final step in FIG. 10 is to calculate and generate an overall performance report card for the supplied product or service (step 1018). But before performing the final step, the application server determines, as shown in steps 1012 and 1014, whether logistics performance data has been received and is therefore available for the overall performance analysis. If it is determined, for example, that no logistics performance data (e.g., supplier conformance reports) are available on the application server, the system may be configured to initiate an ftp session to immediately receive such logistics performance data, as illustrated in FIG. 10 by the arrow indicating a return of control to step 1006.

When the logistics performance data (e.g., supplier conformance reports) become available on the application server, the data is processed and aggregated, as in step 1016, according to a standard measurement criteria, to generate an organization-level logistic grade, which is then saved for the overall supplier performance calculation of step 1018. As part of step 1016, qualitative data relating the logistics measurements, such as the comments and opinions of individual experts working with the supplied products or services, are also collected, summarized and saved at the application server level.

Finally, at step 1018, the pre-deployment grades and comments, the post-deployment grades and comments, and the logistics grades and comments are all used to generate the overall report card for the supplier.

FIG. 11 contains a process flow diagram illustrating the flow of data and steps performed—at various levels of the system—to process responses to customer satisfaction surveys and generate corrective action plans according to one embodiment of the present invention. As shown in FIG. 11, the system may include steps performed by computer systems at Application Server Level 1160, steps performed by individuals and/or computer systems at Organization Level 1170, steps performed by individuals and/or computer systems at Division Level 1180, and steps performed by individuals and/or computer systems at Supplier Level 1190.

The first step, step 1102, is to collect pre- and post-deployment data from the divisions. This step was described in more detail above with reference to FIG. 10, and, more specifically, with reference to steps 1002, 1004, 1008 and 1010 of FIG. 10. Next, the pre- and post-deployment measurement data are checked for completeness in steps 1103 and 1104. If the data is complete, a request is typically made, at step 1106, for the division to participate in a customer satisfaction survey (CSS). If the data is incomplete, additional pre- and post-deployment measurement data may be collected (as illustrated by the arrow indicating a return of control to step 1102). After the division completes the customer satisfaction survey (CSS), step 1108, the survey results are reviewed by the organization, as illustrated in steps 1110 and 1112. In a preferred embodiment, the organization then generates an executive summary of any major performance issues, along with a request for corrective action (CAR), step 1114, and revises any previously-discovered major issues and corrective action requests that already reside on the application server, step 1116. Next, in steps 1118 and 1120, the organization sends a notification to the divisions to review and provide modifications for the executive summary. Any such modifications received from the divisions are then uploaded to the application server (step 1122), which uses the modifications at step 1124 to generate and save electronic versions of a supplier performance report card (ERC), customer satisfaction survey report (CSS) and corrective action request (CAR). When the ERC, CSS and CAR are complete (as determined by the organization at step 1125), they are released for review and published on the application server. See steps 1126 and 1128. In addition, these files may be sent, along with a request for a corrective action plan (CAP), to the supplier (step 1130) at Supplier Level 1190. If in this occurs, the supplier reviews the ERC, CSS and CAR (step 1132), clarifies and resolves any performance-related issues or confusion about the product or service, if necessary (steps 1134 and 1135), and develops and sends a corrective action plan (CAP) back to the organization. See step 1136.

The organization reviews the corrective action plan and uploads it to the application server, step 1138, where it is published for access by the division, step 1139. The division reviews the corrective action plan (CAP), step 1140, and determines whether the plan meets the division's needs and expectations for the product or service. See step 1142. If the division's needs and expectations are met, the division may accept the correction action plan (CAP) and notify the organization of the acceptance, as shown in step 1144. If, on the other hand, the division does not accept the corrective action plan, the division sends a notification to that effect to the supplier and, if applicable, invokes any contractual remedies the division may have available with respect to the performance of the product or service. See step 1146. The supplier would then be expected to resolve the problems associated with the unaccepted corrective action plan, and send a new corrective action plan back to the organization, as shown in step 1148.

Finally, FIG. 12 shows a flow diagram illustrating the overall process flow for a supplier performance and accountability system configured to operate according to an embodiment of the present invention. As illustrated by FIG. 12, the process advantageously incorporates performance and quality measurement activities at multiple stages and levels, including Pre-deployment 1250, Logistics 1260, Application Server Level 1270, Organization Level 1280 and Post-Deployment 1290, to provide a more accurate and comprehensive account of supplier performance. Generally, although not necessarily, the steps depicted in FIG. 12 occur in the relative order they appear as one scans FIG. 12 from left to right.

FIG. 12 shows, for example, that the first step in the overall process is to perform a request for pre-deployment measurement data, step 1202, and make a request for post-deployment measurement data, step 1203. Next, as shown in step 1204, pre-deployment measurement data is provided. This information typically comes from a division of the organization, but may also be provided by a supplier or another part of the organization. The next step, step 1205, is to update the pre-deployment measurement data on the application server. By this time, the post-deployment measurement data requested in step 1203 may be available to the organization because it has been provided, for example, by the division or a supplier. See step 1206. If so, then the post-deployment data is also updated on the application server, as illustrated in step 1207. While these steps are taking place, various problem reporting machines and applications at the division level, for example, may be configured, in a preferred embodiment, to generate and to transmit logistics measurement data (such as monthly vendor compliance reports) to Application Server Level 1270 via an ftp connection, as illustrated by steps 1210 and 1211 of FIG. 12.

As Application Server Level 1270 receives pre-deployment measurement data, post-deployment measurement data and logistics measurement data from the divisions, a pre-processing application, such as Pre-Processor 135 of FIG. 1, for example, may be configured to read, parse and format the data for use by the organization or application server for generating an overall electronic report card (ERC), as shown in steps 1208, 1209, 1212 and 1214. Next, in step 1216, the organization reviews the electronic report card (ERC) in order to determine (at steps 1218, 1220 and 1222, respectively) whether the pre- and post-deployment data, as well as the logistics measurement data, are valid and complete. These determinations are preferably, although not necessarily, made by a human quality and performance expert at the organization level, who may rely on having access to a large body of quantitative and qualitative performance data received from multiple divisions in the organization, as well as perhaps a great deal of personal experience dealing with the divisions reporting the information and the particular products or services in question.

If, at step 1218, the pre-deployment data does not appear to be valid or complete, then the system may be configured to return to step 1202, where additional pre-deployment measurement data is requested, and the whole process is repeated. Likewise, if the post-deployment is invalid or incomplete in step 1220, control passes back to step 1203, where additional post-deployment data is requested. If, at step 1222, the logistics measurement data appears invalid or incomplete, the system may be configured to return to step 1211, thereby initiating another ftp session to receive updated logistics measurements from the division. In each of these cases where the data is determined to be invalid or incomplete, a new electronic report card will be generated at Application Server Level 1270 and reviewed by the organization. Finally, when the pre- and post-deployment measurement data, as well as the logistics measurement data, are determined to be valid and complete, the organization approves and publishes the electronic report card (ERC), as shown in step 1224 of FIG. 12.

The above-described preferred embodiments are intended to illustrate the principles of the invention, but not to limit its scope. Various other embodiments, as well as modifications and equivalents to these preferred embodiments may occur to those skilled in the art upon reading the present disclosure or practicing the claimed invention. Such variations, modifications and equivalents are intended to come within the scope of the invention and appended claims.

What is claimed is:

1. In an organization having a plurality of divisions that receive a supplied product from an outside vendor-supplier, a computer-implemented process for managing performance information for the supplied product, comprising:

identifying, by operation of a computer, a set of performance metrics pertaining to the outside vendor-supplied product, the set of performance metrics including both a pre-deployment stage performance metric and a post-deployment stage performance metric;

for each performance metric in the set of performance metrics, receiving, by operation of said computer, from each division in the plurality of divisions, a division-level quantitative data point, and a division-level qualitative data report;

producing, by operation of said computer, an organization-level quantitative score for the supplied product responsive to the division-level quantitative data point;

producing, by operation of said computer, an organization-level quality assessment for the supplied product responsive to the division-level qualitative report;

generating, by operation of said computer, an overall performance score for the supplied product responsive to the organization-level quantitative score and the organization-level quality assessment; and preventing, by operation of said computer, creation of an executive summary for executives of the organization before said each division has provided said division-level quantitative data point and said division-level qualitative data report.

2. The process of claim 1, wherein the division-level quantitative data point comprises a grade, rank or score for a performance metric.

3. The process of claim 1, wherein the division-level quantitative data point comprises a value representing a count, price, cost, or period of time for a performance metric.

4. The process of claim 1, wherein the division-level qualitative data report comprises a response to a survey.

5. The process of claim 1, wherein the identifying step comprises defining the set of performance metrics.

6. The process of claim 1, wherein the organization-level quantitative data point is derived according to a specified grading criteria.

7. The process of claim 6, wherein the specified grading criteria comprises an organization standard.

8. The process of claim 6, wherein the specified grading criteria comprises an industry standard.

9. The process of claim 6, wherein the specified grading criteria comprises a government standard.

10. The process of claim 1, further comprising determining which of the plurality of divisions possesses information related to the set of performance metrics.

11. The process of claim 1, further comprising establishing a procedure for collecting the division'-level quantitative data point and the division-level qualitative data report from each division in the plurality of divisions.

12. The process of claim 11, wherein the procedure is automated.

13. The process of claim 11, wherein the procedure includes pre-processing the division-level quantitative data point.

14. The process of claim 11, wherein the procedure includes pre-processing the division-level qualitative data report.

15. The process of claim 1, wherein each division in the plurality of divisions provides an update to the division-level qualitative data point according to a specified schedule.

16. The process of claim 15, further comprising receiving an update for the division-level quantitative data point.

17. The process of claim 1, wherein each division in the plurality of divisions provides an update to the division-level qualitative report according to a specified schedule.

18. The process of claim 17, further comprising receiving an update for the division-level qualitative data report.

19. The process of claim 1, wherein the pre-deployment stage comprises system integration.

20. The process of claim 1, wherein the pre-deployment stage comprises system testing.

21. The process of claim 1, wherein the pre-deployment stage comprises delivery.

22. The process of claim 1, wherein the pre-deployment stage comprises installation.

23. The process of claim 1, further comprising receiving from the supplier, for both a pre-deployment stage and a post-deployment stage of the life of the supplied product, a supplier-level quantitative data point for each performance metric in the set of performance metrics.

24. The process of claim 1, further comprising the step of receiving from the supplier, for both a pre-deployment stage and a post-deployment stage of the life of the supplied product, a supplier-level qualitative data report for each performance metric in the set of performance metrics.

25. The process of claim 1, further comprising the step of creating a summary based on the overall performance score.

26. The process of claim 25, further comprising the step of distributing the summary to each division in the plurality of divisions.

27. The process of claim 26, further comprising the step of receiving a verification of the summary from each division in the plurality of divisions.

28. The process of claim 27, wherein the verification comprises an opinion of, a subject matter expert from each division in the plurality of provisions.

29. The process of claim 25, further comprising the step of publishing the summary.

30. The process of claim 29, wherein the summary comprises an electronic document.

31. The process of claim 30, wherein the electronic document is published on an interconnected data communications network.

32. The process of claim 31, wherein the electronic document includes a control configured to display at least one division-level quantitative data point in response to a user input.

33. The process of claim 31, wherein the electronic document includes a control configured to display at least one division-level qualitative data report in response to a user input.

34. The process of claim 31, wherein the interconnected data communications network is an Intranet.

35. The process of claim 31, wherein the interconnected data communications network is the Internet.

36. The process of claim 25, further comprising the step of providing a copy of the summary to the supplier.

37. The process of claim 36, further comprising the step of requesting a corrective action.

38. The process of claim 37, further comprising the step of providing an approval for the corrective action.

39. The process of claim 1, wherein the set of performance metrics includes at least one of the following:
 a degree of compliance with a key contract provision,
 a degree of compliance with a diversity commitment, an extent to which the product was unavailable,
 a degree to which the product failed to conform to design specifications,
 a measure of the extent to which repairs were required as a result of receiving the product,
 an extent to which the product was delivered late,
 an extent to which the product failed during testing,
 a degree to which the product meets expectations,
 a measure of reliability for the product, and
 a measure of maintainability of the product.

40. In an organization having a plurality of divisions that receive a supplied product from an outside vendor-supplier, a computer-implemented process for managing performance information about the supplied product, comprising:
 identifying, by operation of a computer, a set of performance metrics pertaining to the outside vendor-supplied product;
 for at least one performance metric in the set of performance metrics, receiving, by operation of said computer, from each division in the plurality of divisions, for both a pre-deployment stage and a post-deployment stage of the life of the supplied product,
  a division-level quantitative data point for the performance metric, and
  a division-level qualitative report for the performance metric;
 for each division in the plurality of divisions, producing, by operation of said computer, an organization-level quantitative data point responsive to the division-level quantitative data point for each performance metric;
 for each division in the plurality of divisions, producing, by operation of said computer, an organization-level quality assessment for the supplied product responsive to the qualitative data report for each performance metric;
 generating, by operation of said computer, an overall performance score for the supplied product based on the organization-level quantitative data point and the organization-level quality assessment; and
 preventing, by operation computer, creation of an executive summary for executives of the organization before said each division has provided said division-level quantitative data point and said division-level qualitative data report.

41. The process of claim 40, wherein the division-level quantitative data point comprises a grade, rank or score for a performance metric.

42. The process of claim 40, wherein the division-level quantitative data point comprises a value representing a count, price, cost, or period of time for a performance metric.

43. The process of claim 40, wherein the division-level quantitative data point comprises a performance grade.

44. The process of claim 40, wherein the division-level qualitative data report comprises a response to a survey.

45. The process of claim 40, wherein the identifying step comprises defining the set of performance metrics.

46. The process of claim 40, wherein the organization-level quantitative data point is produced according to a specified grading criteria.

47. The process of claim 46, wherein the specified grading criteria comprises an organization standard.

48. The process of claim 46, wherein the specified grading criteria comprises an industry standard.

49. The process of claim 46, wherein the specified grading criteria comprises a government standard.

50. The process of claim 40, wherein the identifying step comprises determining which of the plurality of divisions possesses information related to the set of performance metrics.

51. The process of claim 40, wherein the receiving step comprises establishing a procedure for collecting the division-level quantitative data point and the division-level qualitative data report from the plurality of divisions.

52. The process of claim 40, wherein the receiving step comprises establishing a frequency for receiving the division-level quantitative data point and the division-level qualitative data report from the plurality of divisions.

53. The process of claim 51, wherein the procedure is automated.

54. The process of claim 53, wherein the procedure includes pre-processing the quantitative data point.

55. The process of claim 53, wherein the procedure includes pre-processing the division-level qualitative data report.

56. The process of claim 40, wherein each division in the plurality of divisions provides an update for the division-level qualitative data report.

57. The process of claim 56, wherein the update is provided according to a specified schedule.

58. The process of claim 40, wherein the pre-deployment stage comprises system integration.

59. The process of claim 40, wherein the pre-deployment stage comprises system testing.

60. The process of claim 40, wherein the pre-deployment stage comprises delivery.

61. The process of claim 40, wherein the pre-deployment stage comprises installation.

62. The process of claim 40, further comprising the step of receiving from the supplier, for both the pre-deployment stage and the post-deployment stage of the life of the supplied product, a supplier-level quantitative data point for each performance metric in the set of performance metrics.

63. The process of claim 40, further comprising the step of receiving from the supplier, for both the pre-deployment stage and the post-deployment stage of the life of the supplied product, a supplier-level qualitative data report for each performance metric in the set of performance metrics.

64. The process of claim 40, further comprising the step of creating a summary based on the overall performance score and the organization-level quality assessment.

65. The process of claim 64, further comprising the step of distributing the summary to each division in the plurality of divisions.

66. The process of claim 65, further comprising the step of receiving a verification of the summary from each division in the plurality of divisions.

67. The process of claim 66, wherein the verification comprises an opinion of a subject matter expert from each division in the plurality of provisions.

68. The process of claim 64, further comprising the step of publishing the summary.

69. The process of claim 68, wherein the summary comprises an electronic document; and the electronic document is published on an interconnected data communications network.

70. The process of claim 69, wherein the electronic document includes a control configured to display at least one division-level quantitative data point in response to a user input.

71. The process of claim 69, wherein the electronic document includes a control configured to display at least one division-level qualitative data report in response to a user input.

72. The process of claim 69, wherein the interconnected data communications network is an Intranet.

73. The process of claim 69, wherein the interconnected data communications network is the Internet.

74. The process of claim 64, further comprising the step of providing a copy of the summary to the supplier.

75. The process of claim 74, further comprising the step of requesting a corrective action.

76. The process of claim 75, further comprising the step of providing an approval for the corrective action.

77. The process of claim 40, wherein the division-level quantitative data point is received from each of the plurality of divisions before the product is deployed.

78. The process of claim 77, wherein a second division-level quantitative data point is received from each of the plurality of divisions after the product is deployed.

79. The process of claim 40, wherein the set of performance metrics includes at least one of the following:
 a degree of compliance with a key contract provision,
 a degree of compliance with a diversity commitment,
 an extent to which the product was unavailable,
 a degree to which the product failed to conform to design specifications,
 a measure of the extent to which repairs were required as a result of receiving the product,
 an extent to which the product was delivered late,
 an extent to which the product failed during testing,
 a degree to which the product meets expectations,
 a measure of reliability for the product, and
 a measure of maintainability of the product.

80. A computer-implemented process for improving the performance of a product provided by an outside vendor-supplier to an organization having a plurality of divisions, comprising:
 identifying, by operation of a computer, a set of performance metrics pertaining to the outside vendor-supplied-product;
 receiving, by operation of said computer, from each division in the organization, during both a pre-deployment stage and a post-deployment stage of the life of the product,
  a division-level quantitative data point for the product for each performance metric in the set of performance metrics, and
  a division-level qualitative report of the product for each performance metric in the set of performance metrics;
 for each division, producing, by operation of said computer, an organization-level quantitative score for the product responsive to the division-level quantitative data point;
 for each division, producing, by operation of said computer, an organization-level quality assessment for the product responsive to the division-level qualitative report; and
 preventing, by operation of said computer, creation of an executive summary for executives of the organization before said each division has provided said division-level quantitative data point and said division-level qualitative data report.

81. The process of claim 80, wherein the division-level quantitative data point comprises a grade, rank or score for a performance metric.

82. The process of claim 80, wherein the division-level quantitative data point comprises a value representing a count, price, cost, or period of time for a performance metric and wherein the division-level quantitative data point, during the pre-deployment stage of the life of the outside vendor-supplied product, comprises a date of delivery by the outside vendor-supplier of the product to the organization.

83. The process of claim 80, wherein the division-level qualitative data report comprises a response to a survey.

84. The process of claim 80, further comprising the step of generating an overall performance score based on the organization-level quantitative score and the organization-level quality assessment.

85. The process of claim 84, further comprising the step of creating a summary based on the overall performance score and the organization-level quality assessment.

86. The process of claim 85, further comprising the step of distributing the summary to each division in the plurality of divisions.

87. The process of claim 86, further comprising the step of receiving a verification of the summary.

88. The process of claim 87, wherein the verification comprises an opinion of a subject matter expert from each division in the plurality of provisions.

89. The process of claim 84, further comprising the step of publishing the summary.

90. The process of claim 89, wherein the summary comprises an electronic document; and the electronic document is published on an interconnected data communications network.

91. The process of claim 90, wherein the electronic document includes a control configured to display at least one division-level quantitative data point in response to a user input.

92. The process of claim 90, wherein the electronic document includes a control configured to display at least one division-level qualitative data report in response to a user input.

93. The process of claim 90, wherein the interconnected data communications network is an Intranet.

94. The process of claim 90, wherein the interconnected data communications network is the Internet.

95. The process of claim 85, further comprising the step of providing a copy of the summary to the supplier.

96. The process of claim 95, further comprising the step of requesting a corrective action.

97. The process of claim 96, further comprising the step of providing an approval for the corrective action.

98. The process of claim 80, wherein the division-level quantitative data point is received from each of the plurality of divisions before the product is deployed.

99. The process of claim 98, wherein a second division-level quantitative data point is received from each of the plurality of divisions after the product is deployed.

100. The process of claim 98, wherein the set of performance metrics includes at least one of the following:
a degree of compliance with a key contract provision,
a degree of compliance with a diversity commitment,
an extent to which the product was unavailable,
a degree to which the product failed to conform to design specifications,
a measure of the extent to which repairs were required as a result of receiving the product,
an extent to which the product was delivered late,
an extent to which the product failed during testing,
a degree to which the product meets expectations,
a measure of reliability for the product, and
a measure of maintainability of the product.

101. In an organization that receives a supplied service from a vendor-supplier, a computer-implemented process for managing performance information of the supplied service, comprising:
identifying, by operation of a computer, a set of performance metrics pertaining to the vendor-supplied service, the set of performance metrics including both a pre-deployment stage performance metric and a post-deployment stage performance metric;
for each performance metric in the set of performance metrics, receiving, by operation of said computer, from each division in the organization, a division-level quantitative data point, and a division-level qualitative data report;
producing, by operation of said computer, an organization-level quantitative score for the supplied service responsive to the division-level quantitative data point;
producing, by operation of said computer, an organization-level quality assessment for the supplied service responsive to the division-level qualitative report;
generating, by operation of said computer, an overall performance score for the supplied service responsive to the organization-level quantitative score and the organization-level quality assessment; and
preventing, by operation of said computer, creation of an executive summary for executives of the organization before said each division has provided said division-level quantitative data point and said division-level qualitative data report.

102. In an organization that receives a supplied service from a vendor-supplier, a computer-implemented process for managing performance information about the supplied service, comprising:
identifying, by operation of a computer, a set of performance metrics pertaining to the outside vendor-supplied service;
for at least one performance metric in the set of performance metrics, receiving, by operation of said computer, from each division in the organization, for both a pre-deployment stage and a post-deployment stage of the life of the supplied service,
a division-level quantitative data point for the performance metric, and
a division-level qualitative report for the performance metric;
for said each division producing, by operation of said computer, an organization-level quantitative data point responsive to the division-level quantitative data point for each performance metric;
for said each division, producing, by operation of said computer, an organization-level quality assessment for the supplied service responsive to the qualitative data report for each performance metric;
generating, by operation of said computer, an overall performance score for the supplied service based on the organization-level quantitative data point and the organization-level quality assessment; and
preventing, by operation of said computer, creation of an executive summary for executives of the organization before said each division has provided said division-level quantitative data point and said division-level qualitative data report.

103. A computer-implemented process for improving a service provided by a vendor-supplier to an organization, the process comprising:
identifying, by operation of a computer, a set of performance metrics pertaining to the vendor-supplied-service;
receiving, by operation of said computer, from each division in the organization, during both a pre-deployment stage and a post-deployment stage of the life of the service,
a division-level quantitative data point for the service for each performance metric in the set of performance metrics, and
a division-level qualitative report of the service for each performance metric in the set of performance metrics;
for said each division, producing, by operation of said computer, an organization-level quantitative score for the service responsive to the division-level quantitative data point;
for said each division, producing, by operation of said computer, an organization-level quality assessment for the service responsive to the division-level qualitative report; and
preventing, by operation of said computer, creation of an executive summary for executives of the organization before said each division has provided said division-level quantitative data point and said division-level qualitative data report.

* * * * *